US010360886B2

(12) United States Patent
Kim et al.

(10) Patent No.: US 10,360,886 B2
(45) Date of Patent: Jul. 23, 2019

(54) MOBILE DEVICE AND METHOD FOR EXECUTING MUSIC-RELATED APPLICATION

(71) Applicant: Samsung Electronics Co., Ltd., Gyeonggi-do (KR)

(72) Inventors: Youngeun Kim, Daegu (KR); Seunghun Kim, Gyeonggi-do (KR); Eunjung Seo, Gyeongsangbuk-do (KR); Dongguen Hong, Daegu (KR); Eunyeung Lee, Gyeongsangbuk-do (KR); Minhee Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/899,819

(22) Filed: Feb. 20, 2018

(65) Prior Publication Data
US 2018/0247626 A1 Aug. 30, 2018

(30) Foreign Application Priority Data
Feb. 24, 2017 (KR) ........................ 10-2017-0024976

(51) Int. Cl.
*G04B 13/00* (2006.01)
*G10H 1/00* (2006.01)
(Continued)

(52) U.S. Cl.
CPC ......... *G10H 1/0033* (2013.01); *G06F 3/0482* (2013.01); *G06F 3/04883* (2013.01);
(Continued)

(58) Field of Classification Search
CPC ...... G10H 1/0033; G10H 1/38; G10H 1/0008; G10H 2220/096; G10H 2210/571;
(Continued)

(56) References Cited

U.S. PATENT DOCUMENTS 7,750,224 B1    7/2010   Rav-Niv et al.
9,812,104 B2 *  11/2017  Seo ...................... G10H 1/0091
(Continued)

FOREIGN PATENT DOCUMENTS

KR    1020060106088    10/2006
KR    1020170019242    2/2017

OTHER PUBLICATIONS

International Search Report dated Mar. 22, 2018 issued in counterpart application No. PCT/KR2017/015245, 3 pages.

*Primary Examiner* — Jeffrey Donels
(74) *Attorney, Agent, or Firm* — The Farrell Law Firm, P.C.

(57) ABSTRACT

Provided are a mobile device, a method for operating the same, and a non-transitory computer readable storage medium. The mobile device includes a touch display configured to sense a user input; a memory; and a processor configured to examine, upon receiving the user input for generating an audio file from the touch display, characteristics of the user input and characteristics of a first audio included in first audio data stored in the memory, generate melody data based on the characteristics of the user input and the characteristics of the first audio, generate a second audio based on the melody data and chord information included in the first audio data, and generate the audio file by combining the generated second audio with the first audio.

17 Claims, 18 Drawing Sheets

(51) Int. Cl.
  *G06F 3/0488* (2013.01)
  *G06F 3/0482* (2013.01)
  *G10H 1/38* (2006.01)
  *H04M 1/725* (2006.01)

(52) U.S. Cl.
  CPC ............ *G10H 1/0008* (2013.01); *G10H 1/38* (2013.01); *G10H 2210/066* (2013.01); *G10H 2210/571* (2013.01); *G10H 2220/096* (2013.01); *G10H 2220/131* (2013.01); *G10H 2220/161* (2013.01); *G10H 2230/015* (2013.01); *G10H 2240/081* (2013.01); *G10H 2240/085* (2013.01); *H04M 1/72558* (2013.01)

(58) Field of Classification Search
  CPC ....... G10H 2210/066; G10H 2220/131; G10H 2240/085; G10H 2240/081; G10H 2230/015; G10H 2220/161; G06F 3/0482; G06F 3/04883; H04M 1/72558
  USPC .......................................................... 84/609
  See application file for complete search history.

(56) References Cited

U.S. PATENT DOCUMENTS

| | | |
|---|---|---|
| 2010/0288108 A1 | 11/2010 | Jung et al. |
| 2014/0041512 A1 | 2/2014 | Mastran et al. |
| 2015/0110279 A1 | 4/2015 | Tejerina |
| 2017/0046121 A1 | 2/2017 | Lee et al. |
| 2017/0047053 A1 | 2/2017 | Seo et al. |
| 2018/0247626 A1* | 8/2018 | Kim ..................... G10H 1/0033 |

* cited by examiner

MOBILE DEVICE AND METHOD FOR EXECUTING MUSIC-RELATED APPLICATION

PRIORITY

This application claims priority under 35 U.S.C. § 119(a) to a Korean Patent Application filed on Feb. 24, 2017 in the Korean Intellectual Property Office and assigned Serial number 10-2017-0024976, the entire disclosure of which is incorporated herein by reference.

BACKGROUND

1. Field of the Disclosure

The present disclosure relates to an electronic device that enables music composition, and more particularly, to an electronic device that enables music composition based on drawing input and to a method for operating the electronic device.

2. Description of the Related Art

Various electronic devices such as a smartphone, a tablet personal computer, a portable multimedia player (PMP), a personal digital assistant (PDA), a laptop personal computer, and a wearable device are becoming popular.

Due to the popularization of various electronic devices, techniques and applications have been developed that enable or assist users to compose music using electronic devices.

Such a composition support application may display musical instruments used to perform a piece of music to generate sounds corresponding to the individual musical instruments, respectively. A user may generate sounds by playing the displayed musical instruments, and the generated sounds may be combined to constitute one piece of music. However, if the accompaniment provided by the composition support application and the melody composed by the user do not match each other in a chord or the like, the quality of the music composed by the user may be diminished.

In addition, a user who does not know how to play an instrument cannot readily use a composition support application.

SUMMARY

Aspects of the present disclosure address at least the above mentioned problems and/or disadvantages and provide at least the advantages described below.

An aspect of the present disclosure is to provide a mobile device and method for operating the same that enable music composition based on drawing input from a user.

Another aspect of the present disclosure provides an electronic device and method for operating the same that enable music composition by readily generating melody data including a main melody of music based on drawing input from a user.

Another aspect of the present disclosure provides an electronic device and method for operating the same that enable music composition that generates a melody so that a pitch of an accompaniment is similar to that of a main melody by applying a chord of a music package selected by a user to a melody source corresponding to a drawing input from the user.

Another aspect of the present disclosure provides an electronic device and method for operating the same that enable music composition that generates a variety of sound effects that reflect a characteristics of a user gesture input and a characteristics of a music package to enable a user to compose high-quality music.

In accordance with an aspect of the present disclosure, there is provided a mobile device. The mobile device includes a touch display configured to sense a user input; a memory; and a processor configured to examine, upon receiving the user input for generating an audio file from the touch display, characteristics of the user input and characteristics of a first audio included in first audio data stored in the memory; generate melody data based on the characteristics of the user input and the characteristics of the first audio; generate a second audio based on the melody data and chord information included in the first audio data; and generate the audio file by combining the generated second audio with the first audio.

In accordance with another aspect of the present disclosure, there is provided a method for operating a mobile device. The method includes receiving a first user input for selecting a music package including a first audio and characteristics of the first audio; identifying the characteristics of the first audio; receiving a second user input for generating an audio file from a touch display capable of sensing user input; identifying characteristics of the second user input; generating melody data based on the characteristics of the second user input and the characteristics of the first audio; generating a second audio based on the melody data and chord information included in the first audio data; and generating the audio file by combining the generated second audio with the first audio.

In accordance with another aspect of the present disclosure, there is provided a non-transitory computer-readable storage medium storing a computer program configured to implement an operation method for a mobile device, wherein the computer program, when executed, causes the mobile device to receive a first user input for selecting a music package including a first audio and characteristics of the first audio; identify the characteristics of the first audio; receive a second user input for generating an audio file from a touch display capable of sensing user input; identify characteristics of the second user input; generate melody data based on the characteristics of the second user input and the characteristics of the first audio; generate a second audio based on the melody data and chord information included in the first audio data; and generate the audio file by combining the generated second audio with the first audio.

BRIEF DESCRIPTION OF THE DRAWINGS

The above and other aspects, features, and advantages of the present disclosure will be more apparent from the following detained description, taken in conjunction with the accompanying drawings, in which.

DETAILED DESCRIPTION OF EMBODIMENTS OF THE PRESENT DISCLOSURE

Figure 1:
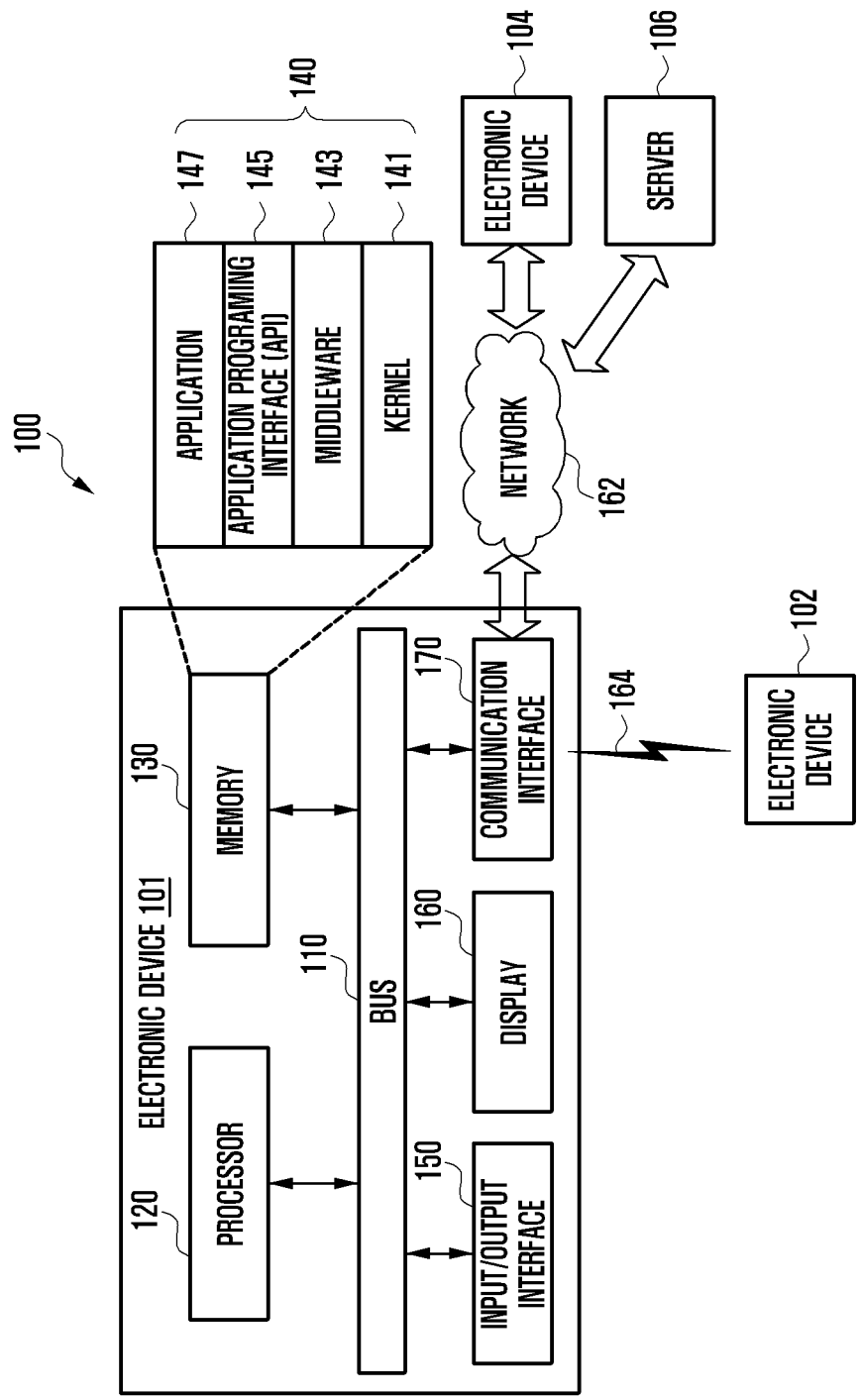
FIG. 1 is a block diagram of an electronic device in a network environment according to an embodiment of the present disclosure.

The following detailed description is made with reference to the accompanying drawings and is provided to aid in understanding the present disclosure. The present disclosure includes various details to assist in that understanding but these are to be regarded as merely examples. Accordingly, those of ordinary skill in the art will recognize that various changes and modifications of the various example embodiments described herein may be made without departing from the scope and spirit of the present disclosure as defined by the appended claims and their equivalents. In addition, descriptions of well-known functions and constructions may be omitted for clarity and conciseness.

The terms used in the following detailed description and claims are not limited to their dictionary meanings, but may simply be used to enable a clear and consistent understanding of the present disclosure. Accordingly, it is intended that the following description of various embodiments of the present disclosure is provided for illustration purposes only and not for the purpose of limiting the present disclosure as defined by the appended claims and their equivalents.

It is intended that the singular forms "a," "an," and "the" include plural referents unless the context clearly dictates otherwise. Thus, for example, reference to "a component surface" includes reference to one or more of such surfaces.

The term "substantially" may generally refer to a recited characteristic, parameter, or value that need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

The expressions "include" and "may include" which may be used in the present disclosure may refer, for example, to the presence of disclosed functions, operations, and elements but are not intended to limit one or more additional functions, operations, and elements. In the present disclosure, the terms "include" and/or "have" may be understood to refer, for example, to a certain characteristic, number, operation, element, component or a combination thereof, but are not intended to be construed to exclude the existence of or a possibility of addition of one or more other characteristics, numbers, operations, elements, components or combinations thereof.

Furthermore, in the present disclosure, the expression "and/or" includes any and all combinations of the associated listed words. For example, the expression "A and/or B" may include A, B, or both A and B.

In an embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely to distinguish an element from other elements. For example, a first user device and a second user device may indicate different user devices, but both of them are user devices. For example, a first element may be referred to as a second element, and similarly, a second element may be also be referred to as a first element without departing from the scope of the present disclosure.

In a case where a component is referred to as being "connected" to or "accessed" by another component, it is intended that not only the component is directly connected to or accessed by the other component, but also there may exist another component between them. In addition, in a case where a component is referred to as being "directly connected" to or "directly accessed" by another component, it is intended that there is no component therebetween.

An electronic device according to the present disclosure may be a device including a communication function. For example, and without limitation, the device may correspond to a combination of at least one of a smartphone, a tablet personal computer (PC), a mobile phone, a video phone, an electronic-book (e-book) reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, a vacuum, an oven, a microwave, a washing machine, an air cleaner, and the like), an artificial intelligence robot, a television (TV), a digital versatile disc (DVD) player, an audio device, various medical devices (for example, a magnetic resonance angiography (MRA) device, a magnetic resonance imaging (MRI) device, a computed tomography (CT) device, a scanning machine, an ultrasonic wave device, and the like), a navigation device, a global positioning system (GPS) a receiver, an event data recorder (EDR), a flight data recorder (FDR), a set-top box, a TV box (for example, Samsung HomeSync®, Apple TV®, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, or the like. It will be apparent to those skilled in the art that an electronic device according to the present disclosure is not limited to the aforementioned devices.

FIG. 1 is a block diagram of an electronic device 101 in a network environment 100 according to an embodiment of the present disclosure.

Referring to FIG. 1, the electronic device 101 may include a bus 110, a processor (e.g., including processing circuitry) 120, a memory 130, an input/output interface (e.g., including interface circuitry) 150, a display 160, a communication interface (e.g., including communication circuitry) 170, and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input/output interface 150, the display 160, the communication interface 170, and the like) through the bus 110, interpret the received commands, and execute a calculation or process data according to the interpreted commands. Although illustrated as one element, the processor 120 may include multiple processors and/or cores without departing from the scope and spirit of the present disclosure. The processor 120 may include various processing circuitry, including a microprocessor or any suitable type of processing circuitry, such as, for example, and without limitation, one or more central processing units (CPUs), general-purpose processors (e.g., advanced reduced instruction set (RISC) machine (ARM) based processors), a digital signal processor (DSP), a programmable logic device (PLD), an application-specific integrated circuit (ASIC), a field-programmable gate array (FPGA), a graphics processing unit (GPU), a video card controller, etc. Any of the functions and steps provided in the accompanying drawings may be implemented in hardware, software or a combination of both and may be performed in whole or in part within the programmed instructions of a computer. In addition, one of ordinary skill in the art may understand and appreciate that a processor or a microprocessor may be hardware in the present disclosure.

The memory 130 may store commands or data received from the processor 120 or other elements (e.g., the input/output interface 150, the display 160, the communication interface 170, and the like) or generated by the processor 120 or the other elements. The memory 130 may include programming modules 140, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from the application 147 and/or the middleware 143, for example, may perform load balancing of the work requests by using a method of assigning a priority, in which system resources (e.g., the bus 110, the processor 120, the memory 130, and the like) of the electronic device 101 can be used, to the application 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various interface circuitry and, for example, may receive a command or data as input from a user, and may deliver the received command or data to the processor 120 or the memory 130 through the bus 110. The display 160 may display a video, an image, data, and the like, to the user.

The communication interface 170 may include various communication circuitry and connect communication between electronic devices 102 and 104 and the electronic device 101. The communication interface 170 may support a short-range communication protocol (e.g., wireless fidelity (Wi-Fi), Bluetooth (BT), and near field communication (NFC)), or a network communication (e.g., the internet, a local area network (LAN), a wide area network (WAN), a telecommunication network, a cellular network, a satellite network, a plain old telephone service (POTS), and the like). Each of the electronic devices 102 and 104 may be a device which is identical (e.g., is of an identical type) to or different (e.g., is of a different type) from the electronic device 101. Further, the communication interface 170 may enable communication between a server 106 and the electronic device 101 via a network 162. Additionally, the communication interface 170 may establish a short-range wireless communication connection 164 between the electronic device 101 and any other electronic device (e.g., electronic device 102).

Figure 2:
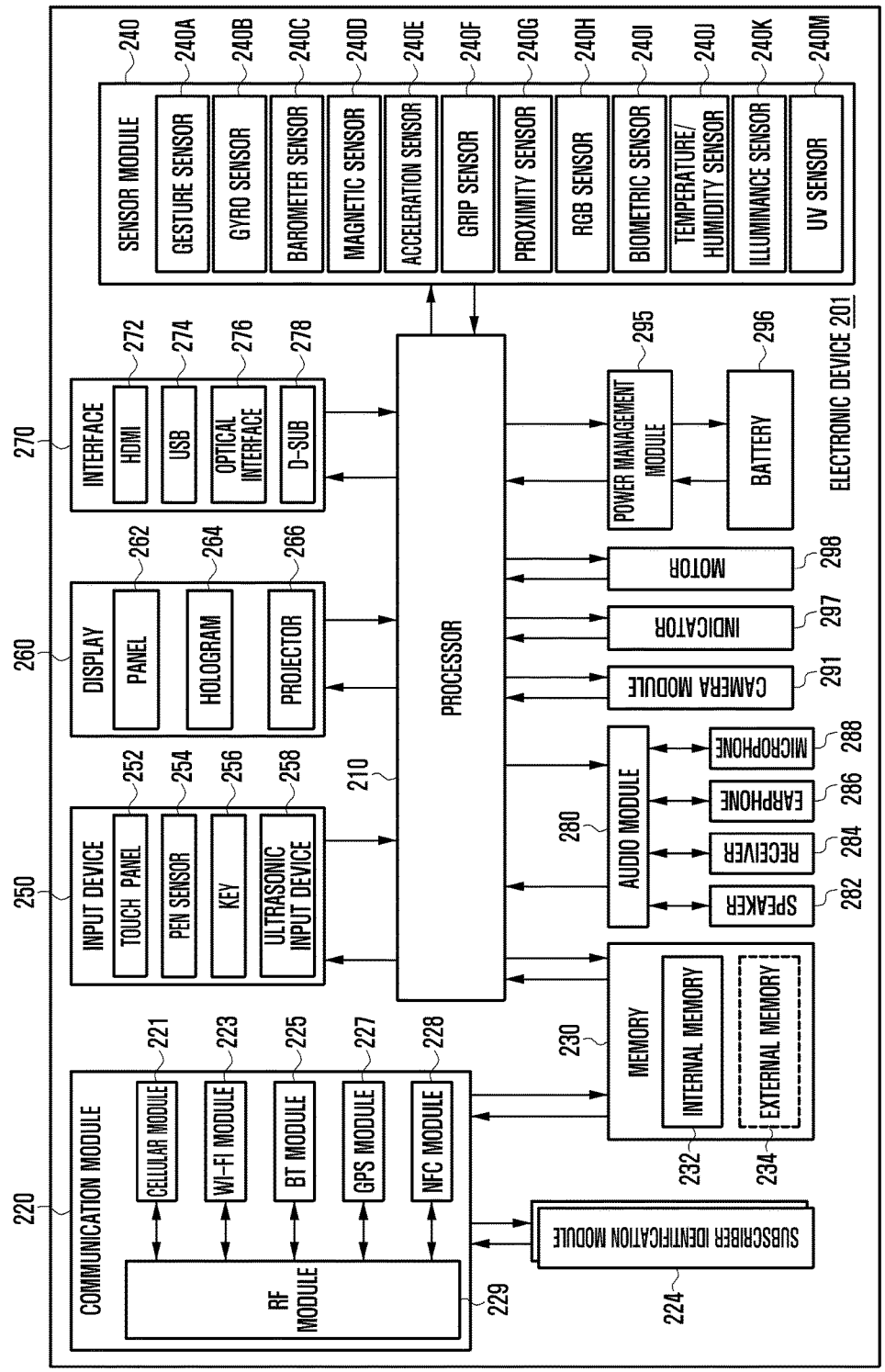
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include a processor (e.g., and application processor (AP) including processing circuitry) 210, a subscriber identification module (SIM) card 224, a memory 230, a communication module (e.g., including communication circuitry) 220, a sensor module 240, an input device (e.g., including input circuitry) 250, a display 260, an interface (e.g., including interface circuitry) 270, an audio module (e.g., including a coder/decoder (codec)) 280, a camera module 291, a power management module 295, a battery 296, an indicator 297, a motor 298 and any other similar and/or suitable components.

The processor 210 may include various processing circuitry, such as, for example, and without limitation, one or more of a dedicated processor, a CPU, APs, and one or more communication processors (CPs). The processor 210 may be, for example, the processor 120 illustrated in FIG. 1. The AP and the CP may be included in the processor 210 in FIG. 2, or may be included in different integrated circuit (IC) packages, respectively. According to an embodiment of the present disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present disclosure, the processor 210 may further include a GPU.

The CP may manage a data line and may convert a communication protocol in the case of communication between the electronic device (e.g., the electronic device 101) including the electronic device 201 and different electronic devices connected to the electronic device through the network. The CP may be implemented by, for example, an SoC. According to an embodiment of the present disclosure, the CP may perform at least some of multimedia control functions. The CP, for example, may distinguish and authenticate a terminal in a communication network using a SIM (e.g., the SIM 224). In addition, the CP may provide a user with services, such as a voice telephony call, a video telephony call, a text message, packet data, and the like.

Further, the CP may control the transmission and reception of data by the communication module 220. In FIG. 2, the elements, such as the power management module 295, the memory 230, and the like are illustrated as elements separate from the processor 210. However, according to an embodiment of the present disclosure, the processor 210 may include at least some of the above-described elements (e.g., the power management module 295).

According to an embodiment of the present disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM 224 may be a card implementing a SIM, and may be inserted into a slot formed in a particular portion of the electronic device 201. The SIM 224 may include unique identification information (e.g., IC card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous dynamic RAM (SDRAM), and the like), and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NOT AND (NAND) flash memory, a NOT OR (NOR) flash memory, and the like). According to an embodiment of the present disclosure, the internal memory 232 may be in the form of a solid state drive (SSD). The external memory 234 may further include a flash drive, for example, a compact flash (CF) drive, a secure digital (SD) drive, a micro-SD drive, a mini-SD drive, an extreme digital (xD) drive, a memory stick, and the like.

The communication module 220 may include various communication circuitry including, for example, and without limitation, a radio frequency (RF) module 229. The communication module 220 may be, for example, the communication interface 170 illustrated in FIG. 1. The communication module 220 may further include various communication circuitry including, for example, and without limitation, wireless communication modules to enable wireless communication through the RF module 229. The wireless communication modules may include, for example, and without limitation, a cellular module 221, a Wi-Fi module 223, a BT module 225, a GPS module 227, and an NFC module 228. Additionally or alternatively, the wireless communication modules may further include a network interface (e.g., a LAN card), a modulator/demodulator (modem), and the like for connecting the electronic device 201 to a network (e.g., the internet, a LAN, a WAN, a telecommunication network, a cellular network, a satellite network, a POTS, and the like).

The communication module 220 may perform data communication with the electronic devices 102 and 104, and the server 106 through the network 162.

The RF module 229 may be used for transmission and reception of data, for example, transmission and reception of RF signals or called electronic signals. The RF unit 229 may include, for example, a transceiver, a power amplifier module (PAM), a frequency filter, a low noise amplifier (LNA), and the like. In addition, the RF module 229 may further include a component for transmitting and receiving electromagnetic waves in free space in a wireless communication, for example, a conductor, a conductive wire, and the like.

The sensor module 240 may include, for example, at least one of a gesture sensor 240A, a gyro sensor 240B, an barometer (e.g., atmospheric pressure) sensor 240C, a magnetic sensor 240D, an acceleration sensor 240E, a grip sensor 240F, a proximity sensor 240G, a red, green and blue (RGB) sensor 240H, a biometric (e.g., bio) sensor 2401, a temperature/humidity sensor 240J, an illumination (e.g., light) sensor 240K, and an ultra violet (UV) light sensor 240M. The sensor module 240 may measure a physical quantity or detect an operating state of the electronic device 201, and convert the measured or detected information into an electrical signal. Additionally/alternatively, the sensor module 240 may include, for example, an electronic nose (E-nose) sensor, an electromyography (EMG) sensor, an electroencephalogram (EEG) sensor, an electrocardiogram (ECG) sensor, a fingerprint sensor, and the like. The sensor module 240 may further include a control circuit for controlling one or more sensors included therein. The sensor module 240 may also, or in the alternative, be controlled by the processor 210.

The input device 250 may include various input circuitry, such as, for example, and without limitation, a touch panel 252, a pen sensor 254 (e.g., a digital pen sensor), a key 256, and an ultrasonic input device 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. In addition, the touch panel 252 may further include a controller. In the capacitive type, the touch panel 252 is capable of recognizing a proximity touch as well as a direct touch. The touch panel 252 may further include a tactile layer. In this event, the touch panel 252 may provide a tactile response to a user.

The pen sensor 254 (e.g., a digital pen sensor), for example, may be implemented by using a method identical or similar to a method of receiving a touch input from a user, or by using a separate sheet for recognition. For example, a key pad or a touch key may be used as the key 256. The ultrasonic input device 258 enables the electronic device 201 to detect a sound wave by using a microphone 288 of the electronic device 201 through a pen generating an ultrasonic signal, and identify data. The ultrasonic input device 258 is capable of wireless recognition. According to an embodiment of the present disclosure, the electronic device 201 may receive a user input from an external device (e.g., a network, a computer, or a server), which is connected to the electronic device 201, through the communication module 220.

The display 260 may include a panel 262, a hologram 264, and a projector 266. The panel 262 may be, for example, a liquid crystal display (LCD) and an active matrix organic light emitting diode (AM-OLED) display, or the like, but is not limited thereto. The panel 262 may be implemented so as to be, for example, flexible, transparent, or wearable. The panel 262 may include the touch panel 252 and one module. The hologram 264 may display a three-dimensional image in the air by using interference of light. The projector 266 may include light-projecting elements, such as LEDs, to project light onto external surfaces. According to an embodiment of the present disclosure, the display 260 may further include a control circuit for controlling the panel 262, the hologram 264, or the projector 266.

The interface 270 may include various interface circuitry, such as, for example, and without limitation, a high-definition multimedia interface (HDMI) 272, a universal serial bus (USB) 274, an optical interface 276, and a d-subminiature (D-sub) connector 278. Additionally or alternatively, the interface 270 may include, for example, an SD/multi-media card (MMC) or an interface according to a standard of the Infrared Data Association (IrDA).

The audio module (e.g., including a codec) 280 may bidirectionally convert between an audio signal (e.g., a voice signal) and an electrical signal. The audio module 280 may convert voice information, which is input to or output from the audio module 280 through, for example, a speaker 282, a receiver 284, an earphone 286, the microphone 288, and the like.

The camera module 291 may capture a still image and a moving image. According to an embodiment of the present disclosure, the camera module 291 may include one or more image sensors (e.g., a front lens or a back lens), an image signal processor (ISP), and a flash LED.

The power management module 295 may manage power of the electronic device 201. The power management module 295 may include, for example, a power management IC (PMIC), a charger IC, or a battery gauge. The PMIC may be mounted to, for example, an IC or an SoC semiconductor. Charging methods may be classified into a wired charging method and a wireless charging method. A charger IC may charge a battery, and prevent an overvoltage or an overcurrent between a charger and the battery. According to an embodiment of the present disclosure, the charger IC may provide at least one of a wired charging method and a wireless charging method. Examples of a wireless charging method may include a magnetic resonance method, a magnetic induction method, an electromagnetic method, and the like. Additional circuits (e.g., a coil loop, a resonance circuit, a rectifier, and the like) for wireless charging may be added in order to perform wireless charging. The battery gauge may measure, for example, a residual quantity of the battery 296, a voltage, a current or a temperature during charging. The battery 296 may supply power by generating electricity, and may be, for example, a rechargeable battery.

The indicator 297 may indicate particular states of the electronic device 201 or a part of the electronic device 201 (e.g., the AP), for example, a booting state, a message state, a charging state and the like. The motor 298 may convert an electrical signal into a mechanical vibration.

The electronic device 201 may include a processing unit (e.g., a GPU) for supporting a module TV. The processing unit for supporting a module TV may process media data according to standards, such as, for example, digital multimedia broadcasting (DMB), digital video broadcasting (DVB), MediaFlow®, and the like.

Each of the above-described elements of the electronic device 201 according to an embodiment of the present disclosure may include one or more components, and the names of the elements may change depending on the type of the electronic device 201. The electronic device 201 may include at least one of the above-described elements. Some of the above-described elements may be omitted from the electronic device 201, or the electronic device 201 may further include additional elements. In addition, some of the elements of the electronic device 201 may be combined into one entity, which may perform functions identical to those of the relevant elements before the combination.

The term "module" used in the present disclosure may refer to, for example, a unit including one or more combinations of hardware, software, and firmware. The term "module" may be interchangeably used with the terms "unit," "logic," "logical block," "component," "circuit," and the like. The term "module" may indicate a minimum unit of a component formed as one body or a part thereof. The term "module" may indicate a minimum unit for performing one or more functions or a part thereof. The term "module" may indicate a unit that is implemented mechanically or electronically. For example, and without limitation, the term "module" according to an embodiment of the present disclosure may refer to a unit that includes at least one of a dedicated processor, a CPU, an ASIC, an FPGA, and a programmable-logic device for performing certain operations which are known or will be developed in the future.

Figure 3:
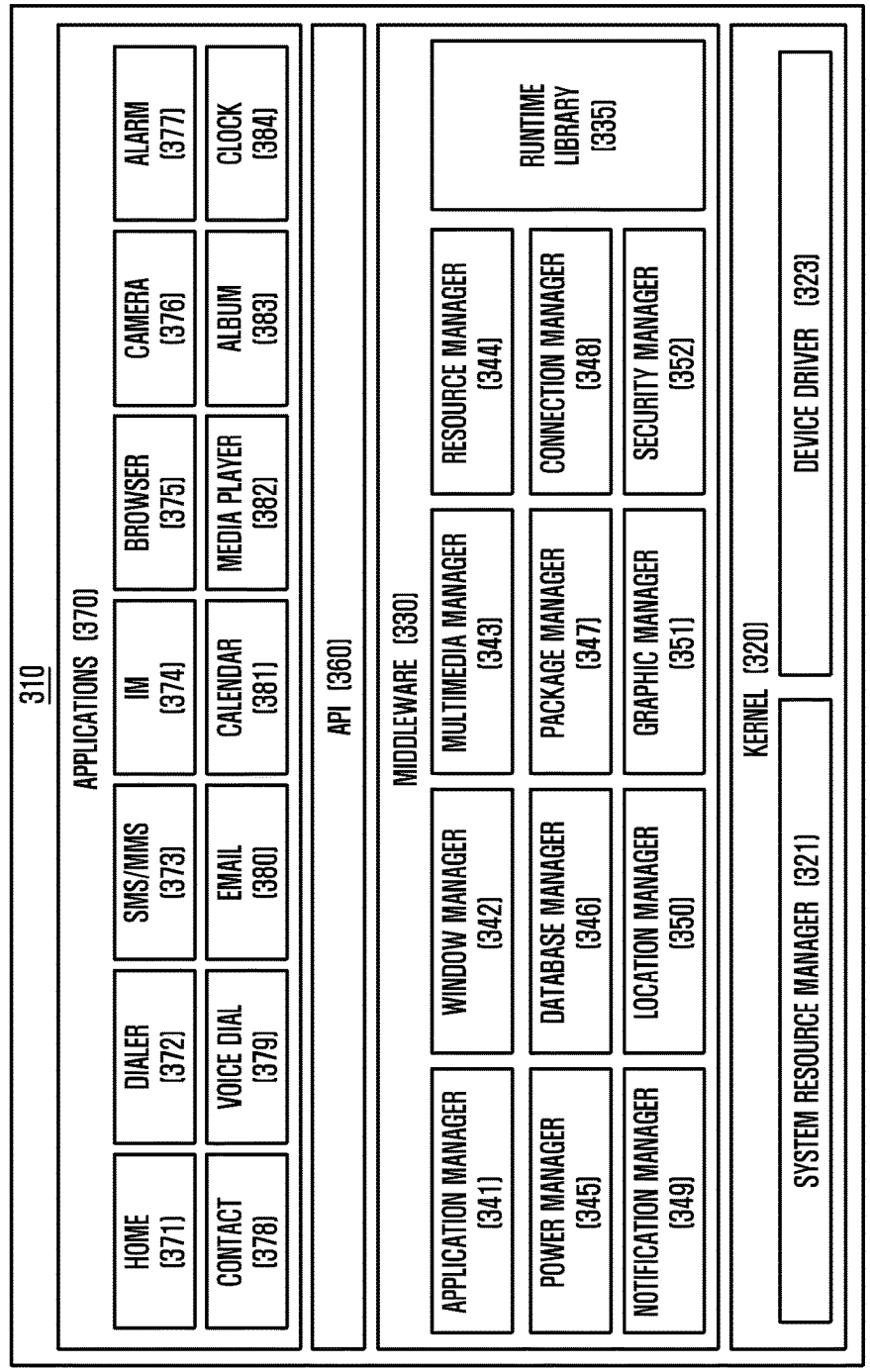
FIG. 3 is a block diagram of an electronic device according to an embodiment of the present disclosure.

FIG. 3 is a block diagram of an electronic device (e.g., a programming module 310) according to an embodiment of the present disclosure.

Referring to FIG. 3, the programming module 310 may be included (or stored) in the electronic device 101 (e.g., in the memory 130) in FIG. 1 or may be included (or stored) in the electronic device 201 (e.g., in the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device and/or various applications (e.g., applications 370) executed in the OS. For example, an OS may be Android®, iOS®, Windows®, Symbian®, Tizen®, Bada™, and the like.

The programming module 310 may include a kernel 320, a middleware 330, an API 360, and/or applications 370. The kernel 320 may include a system resource manager 321 and/or a device driver 323. The system resource manager 321 may include, for example, a process manager, a memory manager, and a file system manager. The system resource manager 321 may perform control, allocation, recovery, and the like of system resources. The device driver 323 may include, for example, a display driver, a camera driver, a BT driver, a shared memory driver, a USB driver, a keypad driver, a Wi-Fi driver, and/or an audio driver. In addition, according to an embodiment of the present disclosure, the device driver 323 may include an inter-process communication (IPC) driver.

The middleware 330 may include multiple modules previously implemented so as to provide a function used in common by the applications 370. In addition, the middleware 330 may provide a function to the applications 370 through the API 360 in order to enable the applications 370 to efficiently use limited system resources within an electronic device. For example, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and any other suitable and/or similar manager.

The runtime library 335 may include, for example, a library module used by a compiler in order to add a new function by using a programming language during execution of the applications 370. According to an embodiment of the present disclosure, the runtime library 335 may perform functions which are related to input and output, the management of a memory, an arithmetic function, and the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as source code, a memory, a storage space, and the like of the applications 370.

The power manager 345 may operate with a basic input/output system (BIOS), manage a battery or power, and provide power information and the like used for an operation. The database manager 346 may manage a database in such a manner as to enable the generation, search and/or change of a database to be used by the applications 370. The package manager 347 may manage the installation and/or update of an application distributed in the form of a package file.

The connection manager 348 may manage wireless connectivity, such as, for example, Wi-Fi and BT. The notification manager 349 may display or report, to a user, an event, such as an arrival message, an appointment, a proximity alarm, and the like in such a manner as not to disturb the user. The location manager 350 may manage location information of an electronic device. The graphic manager 351 may manage a graphic effect which is to be provided to the user and/or a user interface related to the graphic effect. The security manager 352 may provide various security functions used for system security, user authentication, and the like. According to an embodiment of the present disclosure, when an electronic device has a telephone function, the middleware 330 may further include a telephony manager for managing a voice telephony call function and/or a video telephony call function of the electronic device.

The middleware 330 may generate and use a new middleware module through various functional combinations of the above-described internal modules. The middleware 330 may provide modules specialized according to types of OSs in order to provide differentiated functions. In addition, the middleware 330 may dynamically delete some of the existing elements, or may add new elements. Accordingly, the middleware 330 may omit some of the elements described in the various embodiments of the present disclosure, further include other elements, or replace some of the elements with other elements, each of which performs a similar function but has a different name.

The API 360 is a set of API programming functions, and may be provided with a different configuration according to an OS. In the case of Android® or iOS®, for example, one API set may be provided to each platform. In the case of Tizen®, for example, two or more API sets may be provided to each platform.

The applications 370 may include, for example, a preloaded application and/or a third party application. The applications 370 may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the processor 210), the one or more processors may perform functions corresponding to the instructions. The non-transitory computer-readable storage medium may be, for example, the memory 230. At least a part of the programming module 300 may be implemented (e.g., executed) by, for example, the processor 210. At least a part of the programming module 300 may include, for example, a module, a program, a routine, a set of instructions, and/or a process for performing one or more functions.

Names of the elements of the programming module 310 may change depending on the type of OS. The programming module according to an embodiment of the present disclosure may include one or more of the above-described elements. Alternatively, some of the above-described to elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. In addition, some of the operations may be omitted, or other operations may be added to the operations.

Figure 4:
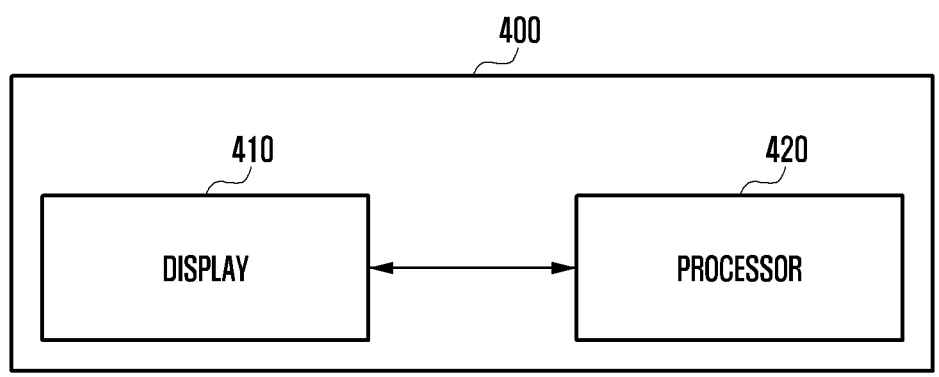
FIG. 4 is a block diagram of an electronic device according to an embodiment of the present disclosure.

FIG. 4 is a block diagram of an electronic device 400 according to an embodiment of the present disclosure.

Referring to FIG. 4, the electronic device 400 may include a display 410, a processor 420, and a sensor.

The display 410 may receive user input. In an embodiment of the present disclosure, a user input may include a gesture input or a drawing input. A gesture input may refer to a user input proximate to the display 410 or a user input on the display 410. A drawing input may refer to an input made by a user who draws a line or model using the user's hand or an input tool (e.g. a touch pen or a mouse). To generate an audio file, a user may enter a drawing on the display 410. Audio generation is described in greater detail below with reference to the processor 420.

To receive a drawing input from a user, the display 410 may be implemented as a combination of a touch panel capable of receiving a drawing input and a display panel. In one embodiment of the present disclosure, to receive a drawing input using a pen, the display 410 may further include a panel capable of recognizing a pen touch. In an embodiment of the present disclosure, to recognize pressure caused by a drawing input, the display 410 may further include a panel implementing a pressure sensor.

The display 410 may display a screen (e.g. FIGS. 7A to 7C) that allows a user to enter a drawing input and select a music package.

The electronic device 400 may further include a sensor. The sensor may sense a gesture input from a user. The sensor may be not separately implemented but may be incorporated into the display 410 so that the display 410 may receive a gesture input from a user.

The processor 420 may identify characteristics of a music package in response to a user input for selecting the music package. The music package may include a first audio used for audio generation, information on types of musical instruments used to generate the first audio, status information on the musical instruments, and a list of sections of the first audio. A section can indicate a largest unit of a piece of music. For example, one piece of music may include an introduction, a refrain, and the like; and the introduction and the refrain may each form a section. A phrase may include a plurality of motifs. A motif may be a smallest meaningful unit of a piece of music. In an embodiment of the present disclosure, an electronic device may generate a single motif using drawing input. A generated motif may be modified on a basis of a characteristics of a drawing input and characteristics of a music package, and the processor 420 may generate a main melody (e.g., a second audio) of music by using the generated and modified motifs. This is described below in greater detail.

A user may enter a drawing input on the display 410, and the drawing input may be used as an input to produce a piece of music contained in an audio file in whole or in sections. As described above, the display 410 may visually present a drawing input entered by a user.

The processor 420 may identify characteristics of a first audio contained in a music package selected by a user and characteristics of a drawing input.

In an embodiment of the present disclosure, characteristics of a drawing input may be identified by four layers. The four layers may include a canvas layer, a motif layer, a history layer, and an area layer.

The canvas layer may be a layer that stores information on drawings contained in a drawing input.

The motif layer may be a layer that stores information on an order in which drawings are input by a drawing input and a position of each drawing drawn on the canvas layer.

The history layer may be a layer that stores information regarding an order in which lines included in each drawing are drawn, a speed at which each line is drawn, a position of each line drawn on the canvas layer, and a process in which each drawing is created.

The area layer may be a layer that stores information regarding an area of the canvas layer occupied by each drawing included in a drawing input, and a point (or area) created by an intersection of drawings included in the drawing input. In an embodiment of the present disclosure, while receiving a drawing input from a user, the processor 420 may generate the four layers to analyze the drawing input.

In an embodiment of the present disclosure, the processor 420 may identify characteristics of a first audio included in a music package. A music package may be a file containing information needed by an audio file corresponding to a music composition and composed music. In other words, a music package may refer to a file that contains first audio data corresponding to audio of an audio file and data related to characteristics of a first audio. A music package may also include a tag associated with characteristics of a first audio. The processor 420 may control the display 410 to display a screen enabling one or more tags to be selected. A user may select a tag from a tag selection screen displayed on the display 410, and generate an audio file using a music package corresponding to the selected tag. This is described below in greater detail with reference to FIGS. 7A to 7C.

For example, characteristics of a first audio may include types of sections (e.g. an introduction, a refrain) of the first audio, characteristics of each section (e.g. a length, a tone, sound effects, meter (bpm)), an order of the sections, a melody applicability to each section (e.g. a melody that may be generated by a drawing input of a user may not be applied to an introduction, but a melody that may be generated by a drawing input of a user may be applied to a refrain), and chord scale information.

A chord scale corresponding to a first audio may refer to a group of chord scales that may be applied to a second audio generated by a drawing input. In an embodiment of the present disclosure, a chord scale may be assigned to each section included in a first audio. A chord scale may include information regarding progress, characteristics, and a purpose of a chord (i.e. for brightening a mood of a song or for darkening the mood of the song, etc.).

In an embodiment of the present disclosure, the processor 420 may generate a second audio by applying one of chords included in a chord candidate group to melody data generated by a drawing input. In this case, the second audio may indicate a main melody of a section (or phrase, motif) to which the second audio is applied. Melody data is described below is greater detail.

The processor 420 may extract a motif based on characteristics of a drawing input identified using the four layers. For example, a motif may be generated on a basis of an order of drawings contained in the motif layer among the four layers, and positions of drawings on the canvas layer. On the canvas layer shown in FIG. 6A, there are points 611 to 616 on a drawing 610. On the canvas layer, the y-axis value rises from the initial point 611 via the point 612 to the point 613, decreases sharply from the point 613 to the point 614, and increases from the point 614 via the point 615 to the point 616. In this case, a motif generated by such a drawing may indicate the following information with respect to pitch. That is, the pitch rises in the interval from the point 611 to the point 613 where the y-axis value increases; the pitch falls in the interval from the point 613 to the point 614; and the pitch rises again in the interval from the point 164 to the point 616. In an embodiment of the present disclosure, a motif may include information about changes in pitch corresponding to a drawing input.

The processor 420 may identify characteristics of a drawing input through the area layer among the four layers. For example, the processor 420 may identify an area of the canvas layer occupied by drawings contained in the area layer.

The processor 420 may identify characteristics of elements (e.g. lines) included in a drawing using the history layer among the four layers. For example, the processor 420 may check a process of making a drawing, an order of lines included in the drawing, a position of the lines located on the motif layer, a slope (or velocity) of the lines, and a time taken to make the drawing. In an embodiment of the present disclosure, the processor 420 may modify a motif extracted from the motif layer on a basis of characteristic information of elements included in a drawing input and a drawing extracted from the area layer and/or the history layer.

When the display 410 includes a pressure sensor capable of sensing pressure, the processor 420 may modify a motif extracted from the motif layer based on the sensed pressure.

Below a description is given in greater detail of modification of a motif and generation of melody data using the modified motif.

The processor 420 may determine a length (or a time) of a second audio (which may be generated by melody data) to be generated using a motif extracted from the motif layer. The processor 420 may determine a length of melody data based on characteristics of a first audio. The processor 420 may develop a motif up to a determined length of a second audio. For example, when a length of a motif is 4 and a length of a second audio is 16, the processor 420 may generate melody data with a total length of 16 on a basis of a first motif generated using the motif layer and a second motif generated by modulating the first motif using the history layer or the area layer.

The processor 420 may modify a motif based on an area of a drawing extracted from the area layer. In an embodiment of the present disclosure, the processor 420 may determine a complexity of a motif modulation depending on an area of a drawing. As a complexity of a motif modulation increases, a degree of repetition of a motif may decrease; and as the complexity of the motif modulation decreases, the degree of repetition of similar motifs may increase. For example, the processor 420 may determine a complexity of a motif modulation in proportion to an area of a drawing.

Figure 6A:
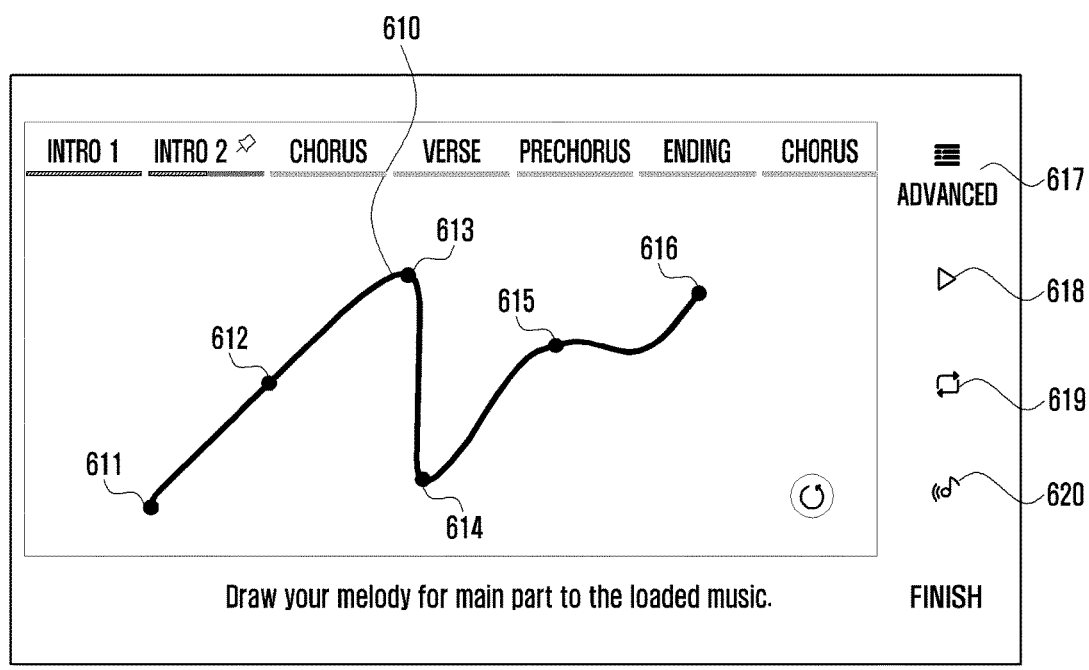
FIGS. 6A, 6B, 6C, and 6D are illustrations of drawing input and melody modulation based thereon in an electronic device according to an embodiment of the present disclosure.
Figure 6B:
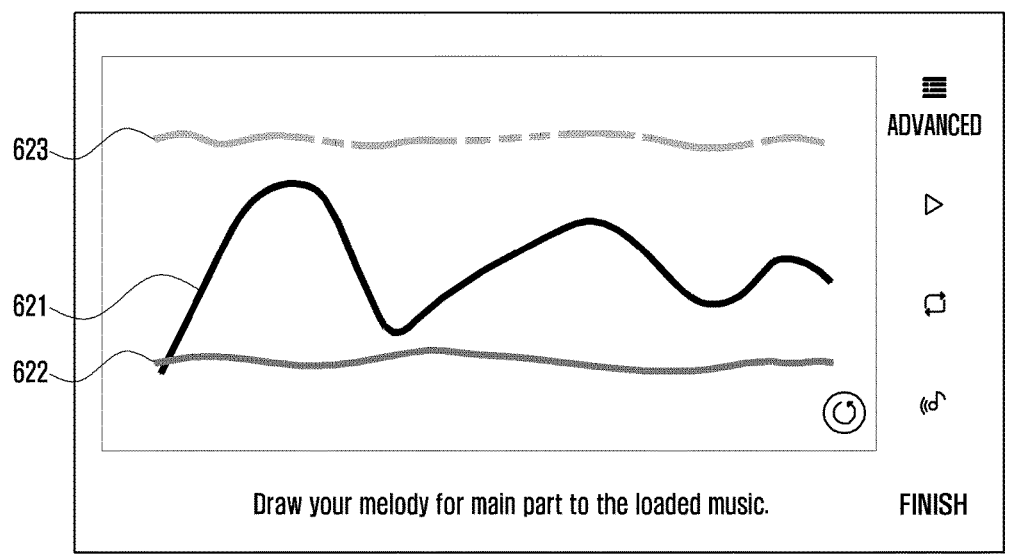
Figure 6C:
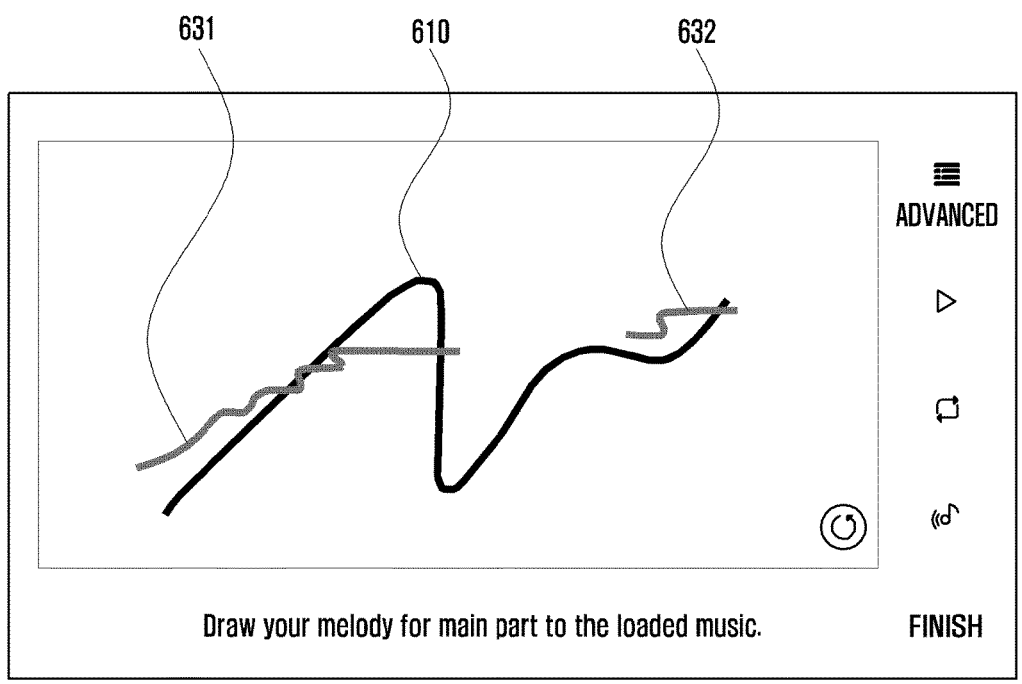
Figure 6D:

The processor 420 may modify a motif by using velocity information of lines included in a drawing extracted from the history layer in a manner that changes a rhythm. FIG. 6D illustrates a velocity table 640 of a drawing 610 for which a drawing velocity is mapped. The processor 420 may use the velocity table 640 to extract an average velocity and a maximum velocity at which the drawing 610 is drawn. The velocity table 640, includes velocity information for a portion corresponding to the drawing 610. In one embodiment of the present disclosure, the processor 420 may apply a delay effect among sound effects to a portion corresponding to the motif 610 among melody data on a basis of an average velocity extracted from the velocity table 640. The processor 420 may also apply sound effects to push a sound to a portion corresponding to the motif 610 among melody data on a basis of a maximum velocity extracted from the velocity table.

For example, if a velocity at which a line is drawn exceeds a preset value, a motif can be modified using another rhythm. In an embodiment of the present disclosure, if a velocity exceeds a preset value, the processor 420 may modify a rhythm corresponding to a motif. In addition, if a velocity is below a preset value, the processor 420 may modify a pitch corresponding to a motif.

The processor 420 may change a tone of a motif using slope information of a line extracted from the history layer. A tone may indicate a sensory feature resulting from a difference in sound components. A tone may also be changed by modifying a frequency of a sound.

The processor 420 may change a pitch included in a motif on a basis of a direction and length information of a line extracted from the history layer. A motif may include a relative difference between notes included in the motif. The processor 420 may modify a motif by adjusting a relative difference between notes included in the motif based on a direction and length of a line.

The processor 420 may modify a motif based on an order of drawing input extracted from the history layer. In FIG. 6B, a drawing input includes three lines. It is possible to determine which of the three lines included in the drawing input is most significant for motif modification in consideration of an input order of the lines. For example, a feature corresponding to the most recently drawn line 623 may be more significant for modifying a motif than a feature corresponding to the other lines 621 and 622.

In an embodiment of the present disclosure, the processor 420 may modify a motif generated using the motif layer based on three layers reflecting characteristics of a drawing input. FIG. 6C illustrates a motif 610 created using the motif layer and modified motifs 631 and 632. The processor 420 may generate modified motifs 631 and 632 in consideration of characteristics of the motif 610. The modified motifs 631 and 632 can be used for phrase generation and section generation.

In an embodiment of the present disclosure, the processor 420 may combine modified and existing motifs (motif development) to generate a phrase, and may combine generated phrases to generate a section. The processor 420 may combine generated sections to generate one piece of melody data.

The processor 420 may extract positions of lines and intersection components generated by intersecting lines from the area layer to add chords to melody data.

Various techniques may be used for generating a phrase by modifying a pitch corresponding to a motif and developing the motif. Table 1 below describes techniques for motif development by using a motif modified through pitch modification.

TABLE 1

| Pitch modification | Modification technique |
|---|---|
| Repetition | Motif development by repeating a pitch |
| Inversion | Motif development by inverting a motif with respect to a median of pitches contained in the motif |
| Sequence | Change all pitch values included in a motif |
| Transposition | Change an order of pitches included in a motif |

Various techniques may be used for generating a phrase by modifying a rhythm corresponding to a motif and developing the motif. Table 2 below describes techniques for motif development by using a motif modified through rhythm modification.

TABLE 2

| Rhythm modification | Modification technique |
|---|---|
| Retrograde | Motif development by reversing an order of progression of a total rhythm |
| Inversion | Reverse a rhythm shape with respect to a mid-time of a whole rhythm (e.g. rhythm "A + B" is changed to "B + A") |
| Augmentation | Increase a duration of a rhythm |
| Diminution | Reduce a duration of a rhythm |

The processor 420 may combine generated phrases to create a section (section building). In an embodiment of the present disclosure, a generated motif may be combined with a motif modified based on characteristics of drawings to generate a phrase; and the generated phrase may be combined with a modified phrase to build a section. There may be various ways to create a section. Table 3 below describes some techniques for section building.

TABLE 3

| Section building | Modification |
|---|---|
| Symmetric | Technique usable for a section including an even number of phrases (implementable in ABAB format) |
| Asymmetric | Technique usable for a section including an odd number of phrases (implementable in ABAA format) |

The processor 420 may combine sections generated through section building to generate melody data. While a second audio includes absolute pitch values of a main melody (e.g. a main melody may include information such as Do, Mi, and Sol) corresponding to a drawing input of a user, melody data may include relative pitch values of a second audio (for example, information indicating that, for a melody with three notes, a second note is two tones higher than a first note, and a third note is four tones higher than the first note).

In an embodiment of the present disclosure, melody data may include information regarding relative pitch values in the melody data, a start point of sound, a length of sound (rhythm), an intensity of sound (velocity), tone colors, and sound effects. Sound effect information may include information regarding types of sound effects (e.g. delay, chorus, reverb, filter, or distortion), start points of sound effects, coverage, and setting values. For example, sound effects may be generated in consideration of not only characteristics of a drawing input but also characteristics of a first audio included in a music package. Table 4 below lists elements used to generate melody data and their results.

TABLE 4

| | Input elements | Used elements and results |
|---|---|---|
| Features of a drawing input | Drawing y-axis information | Modify a pitch |
| | Drawing x-axis information | Modify a tempo of a second audio by changing a beat and a time |
| | Average drawing velocity | Generate a feeling of a slowing sound by adjusting a delay element among sound effects |
| | Maximum drawing velocity | Generate a feeling of sound being pushed by adjusting a delay effect and feedback among sound effects |
| | Drawing process complexity | Control complexity of a melody line by adjusting a complexity of the melody line |
| | Drawing intensity | Produce a stereoscopic feeling for a second audio by adjusting dynamics of the second audio |
| Features of a first audio | Hash tag of music package (light or dark feeling) | Match a brightness of a second audio with a brightness of a first audio |
| | Hash tag of music package (swing) | Apply genre characteristics of a first audio to a second audio |
| | Hash tag of music package (song length) | Set a length of a second audio to a length of a first audio |
| | Section selection of music package | Apply a harmony of a first audio to a harmony of a second audio |

In an embodiment of the present disclosure, the processor 420 may modify a motif in consideration of characteristics of a first audio included in a music package as well as characteristics of a drawing input, and may add a sound effect to a motif in consideration of the characteristics of the first audio included in the music package.

Processor 420 may determine a chord scale of a first audio included in a music package. As described above, a chord scale may refer to a group of candidate chords applicable to melody data. The processor 420 may use chord scale information to determine an optimal chord to be applied to melody data. For example, the processor 420 may determine a chord, among chords included in a chord scale, corresponding to values of a rhythm such as a length, a height, and a slope included in melody data. Chord scale information may be included in a music package, but the processor 420 may determine the chord scale information by analyzing a first audio.

For example, the processor 420 may determine a chord to be applied to melody data among chords of a chord scale and may change relative pitch values contained in the melody data to absolute pitch values. For example, melody data with three notes may have relative information that a second note is two tones higher than a first note and a third note is four tones higher than the first note. The processor 420 may apply a determined chord to melody data to generate a second audio in which a first note is Do, a second note is Mi, and a third note is Sol. In an embodiment of the present disclosure, the electronic device 400 may generate an audio file by combining a second audio generated based on a drawing input with a first audio included in a music package.

In an embodiment of the present disclosure, the processor 420 may determine musical instruments matching melody data among a plurality of musical instruments used to produce a first audio included in a music package. The processor 420 may combine the first audio played by the determined musical instruments with a second audio to generate an audio file.

In an embodiment of the present disclosure, in a first audio included in a music package, tracks played by individual musical instruments may be partially modified according to a user selection. A first audio generated by combining modified tracks may be combined with a generated second audio to generate an audio file.

In an embodiment of the present disclosure, a first audio played by musical instruments selected by a user among musical instruments use to produce the first audio included in a music package may be combined with a generated second audio to generate an audio file. The audio file may be generated using an extension that an electronic device can support. The audio file may be stored in an editable form, so that another electronic device (e.g. a digital audio workstation (DAW)) can readily edit the audio file.

In an embodiment of the present disclosure, the electronic device 400 may further include a sensor to collect ambient context information. The ambient context information may be collected by a sensor or stored in a memory of an electronic device. For example, the ambient context information may indicate profile information and activity information included in a user's social networking service (SNS) account.

The processor 420 may generate a motif by analyzing ambient context information. For example, a motif can be generated using ambient context information such as a number of steps, a movement speed, and a travel distance of a user, and local weather of an area where the electronic device 400 is located. A motif may also be generated in consideration of a sound output from the electronic device 400 (e.g., music played by a music player application). As described above, a motif generated by the processor 420 may be used to generate melody data.

Figure 5:
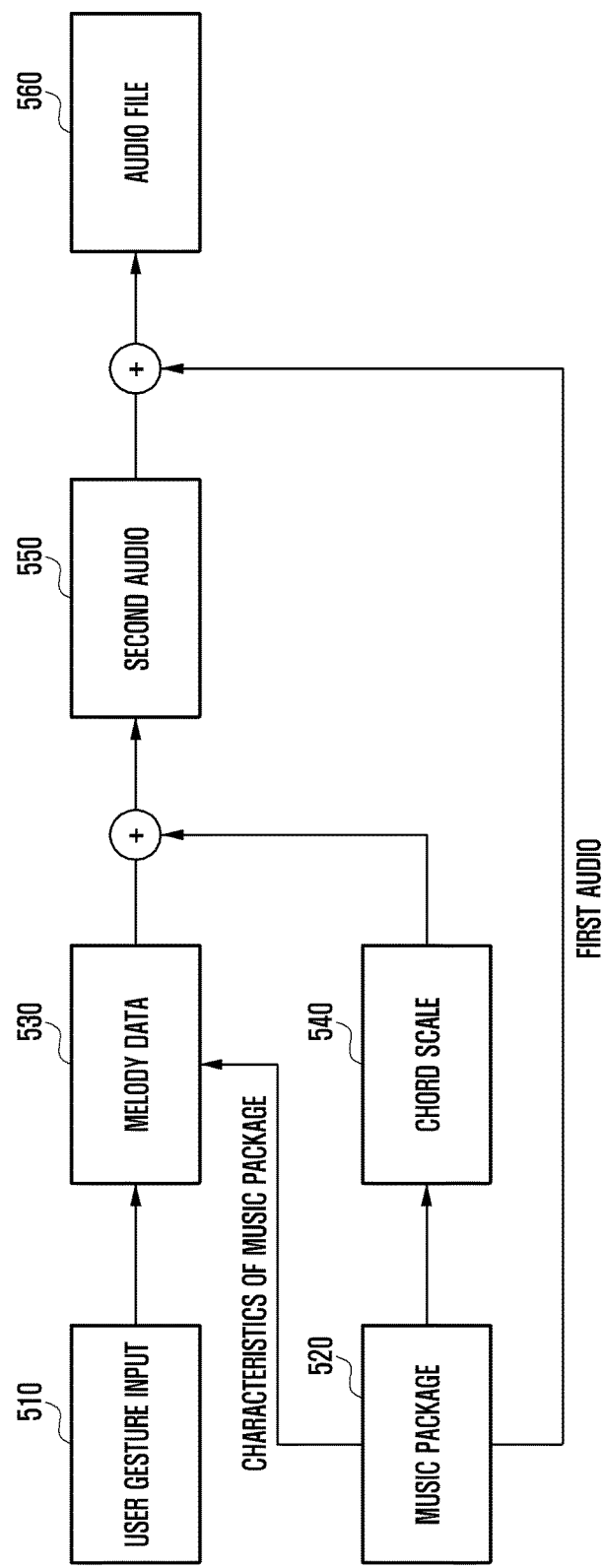
FIG. 5 is a method of generating an audio file in an electronic device according to an embodiment of the present disclosure.

In an embodiment of the present disclosure, the processor 420 may determine a music package corresponding to ambient context information among music packages usable for generating an audio file, and generate melody data and a second audio using a music package corresponding to the ambient context information. FIG. 5 is a method of an electronic device to generate an audio file according to an embodiment of the present disclosure.

Referring to FIG. 5, the method for generating an audio file is described below using a user gesture input and a music package.

The processor 420 may generate melody data 530 in consideration of characteristics of a user gesture input 510 entered by a user on the display 410 and the characteristics of a music package 520 selected by the user.

The processor 420 may combine a chord scale 540, which is a portion of characteristics of a music package 520 or is generated through analysis of a first audio, with melody data 530 to produce a second audio 550. In an embodiment of the present disclosure, the melody data 530 has relative pitch values of included notes, and the processor 420 uses the chord scale 540 to convert the relative pitch values of the notes included in the melody data 530 to absolute pitch values.

The processor 420 may combine a generated second audio 550 with a first audio included in a music package 520 to generate an audio file 560. Thereby, the user of the electronic device 400 may easily compose a piece of music whose first audio is music contained in a music package 520 using the user gesture input (e.g. drawing input) 510. FIGS. 7A to 7E are screen representations depicting music package selection in an electronic device according to an embodiment of the present disclosure. The following description concerns a scenario where a drawing input is received among various examples of a user gesture input.

Figure 7A:
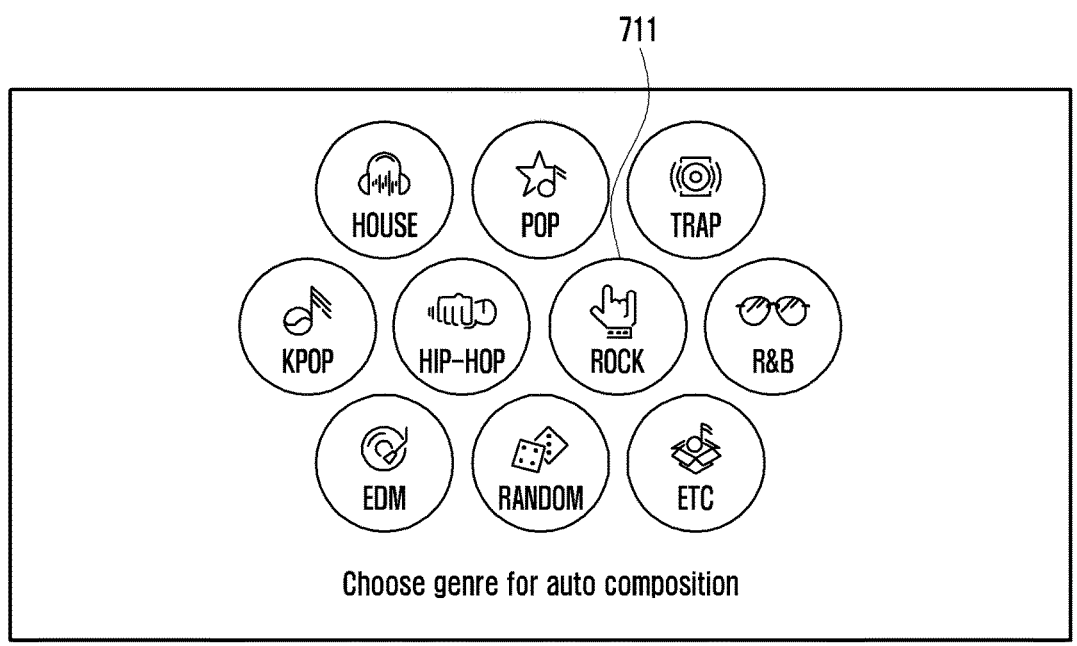
FIGS. 7A, 7B, 7C, 7D, and 7E are screen representations depicting music package selection in an electronic device according to an embodiment of the present disclosure.

Referring to FIGS. 7A-7E, the electronic device 400 may display a screen permitting a user to select a desired genre among a plurality of genres on the display 410. FIG. 7A shows a screen for displaying individual genres of music. The following description concerns a scenario where a user selected "rock" as a genre.

Figure 7B:
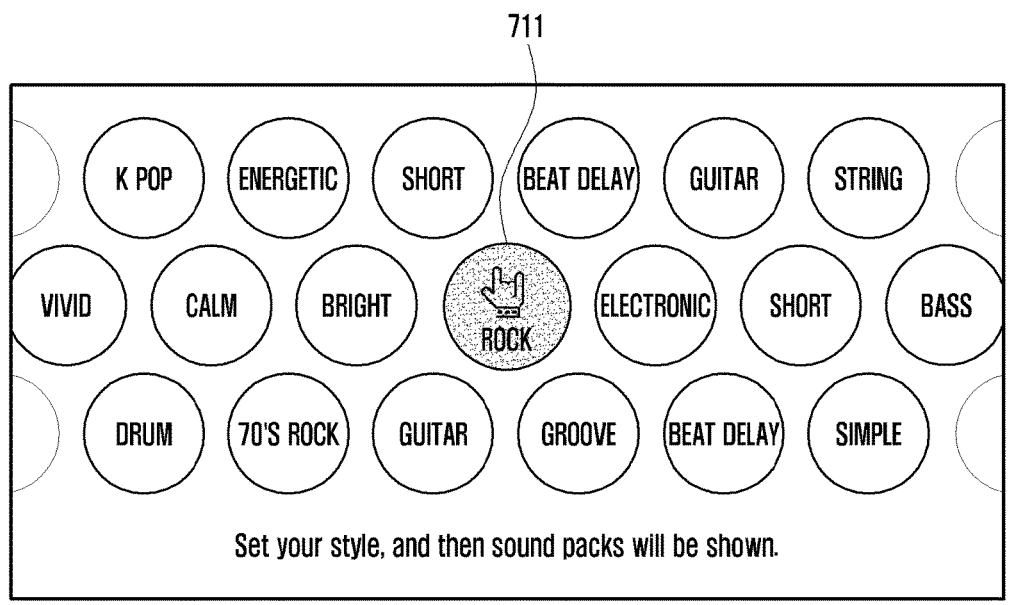

In response to a genre selection, the display 410 may display tags corresponding to the selected genre as shown in FIG. 7B. FIG. 7B shows various tags corresponding to the selected genre 711. For example, Table 5 below illustrates an embodiment of genres and associated tags.

TABLE 5

| Genres | Tags |
|---|---|
| EDM | Energetic |
|  | Emotional |
|  | Drama |
|  | Fresh |
|  | Fun |
|  | Sad |
|  | Sentimental |
|  | Tension |
|  | Mystery |
|  | Fantasy |
|  | Chic |
|  | Powerful |
|  | Magnificent |
|  | Dark |

TABLE 5-continued

| Genres | Tags |
|---|---|
|  | White |
|  | Musical |
|  | Season |
|  | Dancy |
|  | Generation |
| Rock | K-POP |
|  | ENERGETIC |
|  | SHORT |
|  | BEAT DELAY GUITAR |
|  | STRING |
|  | VIVID |
|  | CALM |
|  | BRIGHT ELECTRONIC |
|  | DRUM |
|  | 70'S ROCK |
|  | GROOVE |

Although some genres and tags correspond to the genres listed in Table 5 above, the present disclosure is not limited thereto. The present disclosure may utilize a variety of genres, sub-genres, tags, and sub-tags. In FIG. 7B, various tags corresponding to the rock genre selected by the user are presented as circles. In an embodiment of the present disclosure, there is no limit to a format in which tags are presented. As shown in FIG. 7B, each tag may be displayed inside a circle, but each tag may also be displayed using various shapes such as a square and a triangle.

Figure 7C:
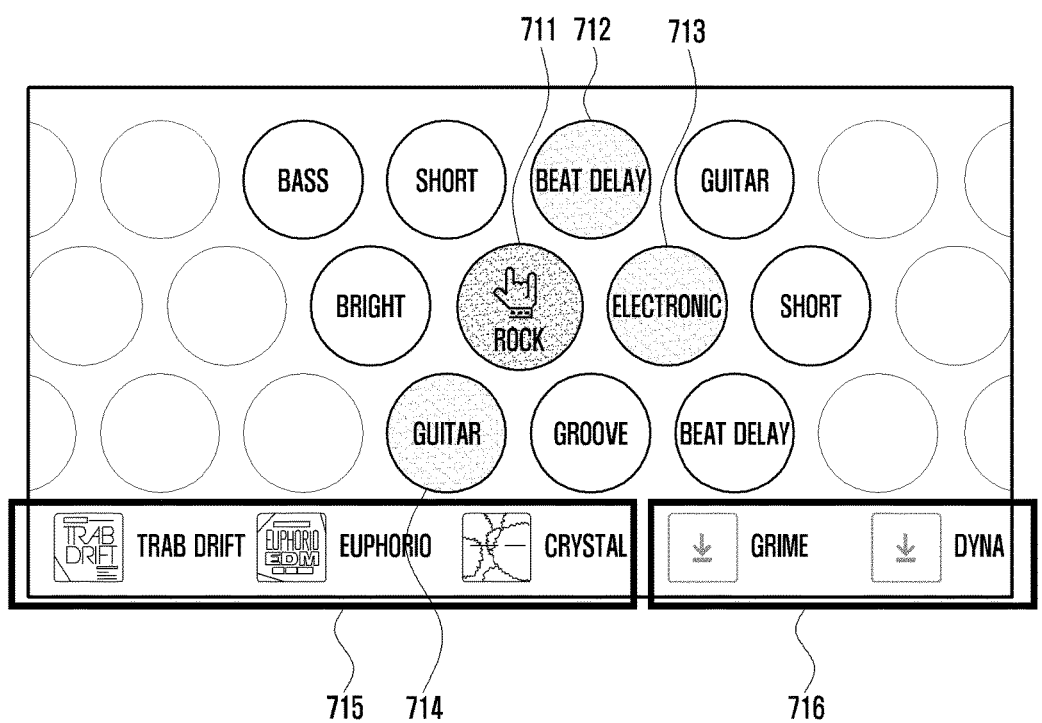
Figure 7D:
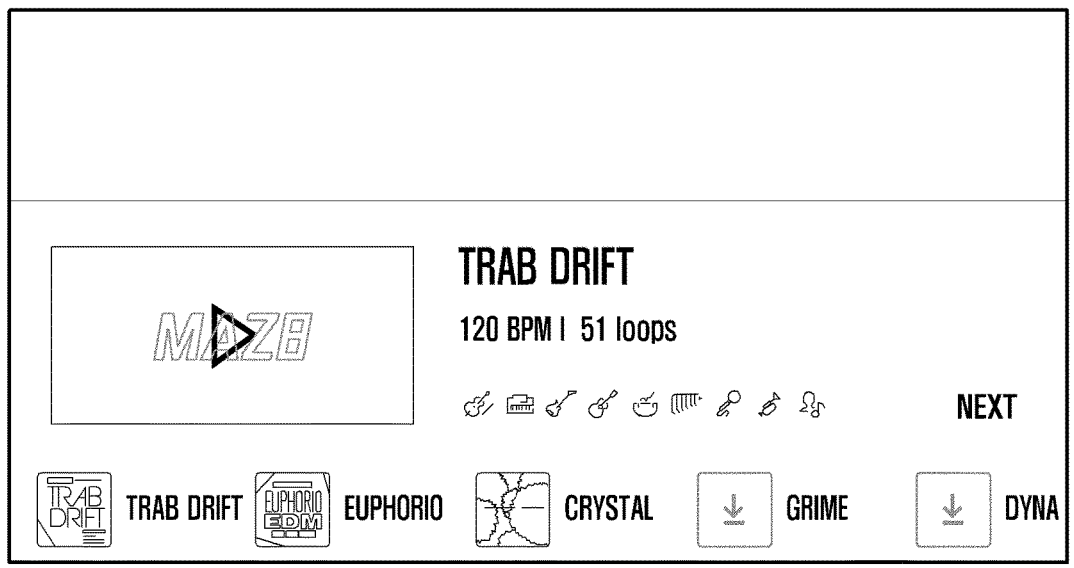

When a user selects a tag "beat delay" 712 while the screen of FIG. 7B is displayed on the display 410, the processor 420 may display a list of music packages corresponding to the selected genre 711 (rock) and the selected tag 712 on the display 410. FIG. 7C shows a list of music packages corresponding to the selected genre 711 and the selected tag 712. In an embodiment of the present disclosure, to add a music package that is not present in a memory of the electronic device 400, when the user selects a separate button 716, the processor 420 may control a communication module to download a music package corresponding to the selected genre 711 and the selected tag 712 from a server. The processor 420 may determine a music package corresponding to the genre 711 and the selected tags 712, 713 and 714, and control the display 410 to display a list of music packages corresponding to the genre 711 and the selected tags 712, 713 and 714. FIG. 7C shows a music package list 715 corresponding to the genre 711 and the selected tags 712, 713 and 714. As described above, the electronic device 400 may readily provide a user with a music package usable for composition. FIG. 7D illustrates a detailed screen of a music package selected from among music packages corresponding to the genre 711 and the selected tags 712, 713 and 714. Tags may be defined when a music package is created. The processor 420 may filter a music package corresponding to a genre and tag selected by a user (a music package may be stored in the electronic device 400 or be provided by a server).

A selected tag may be used for generation of a second audio. In an embodiment of the present disclosure, the processor 420 may modify a motif in consideration of characteristics of selected tags. This is described in relation to Table 4 above. For example, if a feature of a selected tag is associated with a swing (one of the styles of jazz) feature of a variation, the processor 420 may modify a generated melody data by applying a swing effect to the generated melody data. In addition, the processor 420 may modify a first audio by applying a swing effect to the first audio.

Features or characteristics corresponding to a music package may be pre-stored in a memory of the electronic device 400. For example, features corresponding to a music package may be stored in a format shown in Table 6 below.

TABLE 6

| Length of first audio | Complexity | Variation |
|---|---|---|
| Short (under 1 minute) | Simple<br>Every part is of complexity ≤3 | Swing |
| Medium (under 4 minutes) | Complicated<br>Every part is of complexity ≥5 | Too much swing |
| Long (over 5 minutes) |  | Groove (Velocity)<br>Too much groove (Velocity)<br>Drum short<br>Drum very short |

In an embodiment of the present disclosure, the processor 420 may generate an audio file using a music package selected by a user as shown in FIGS. 7A to 7D.

Figure 7E:
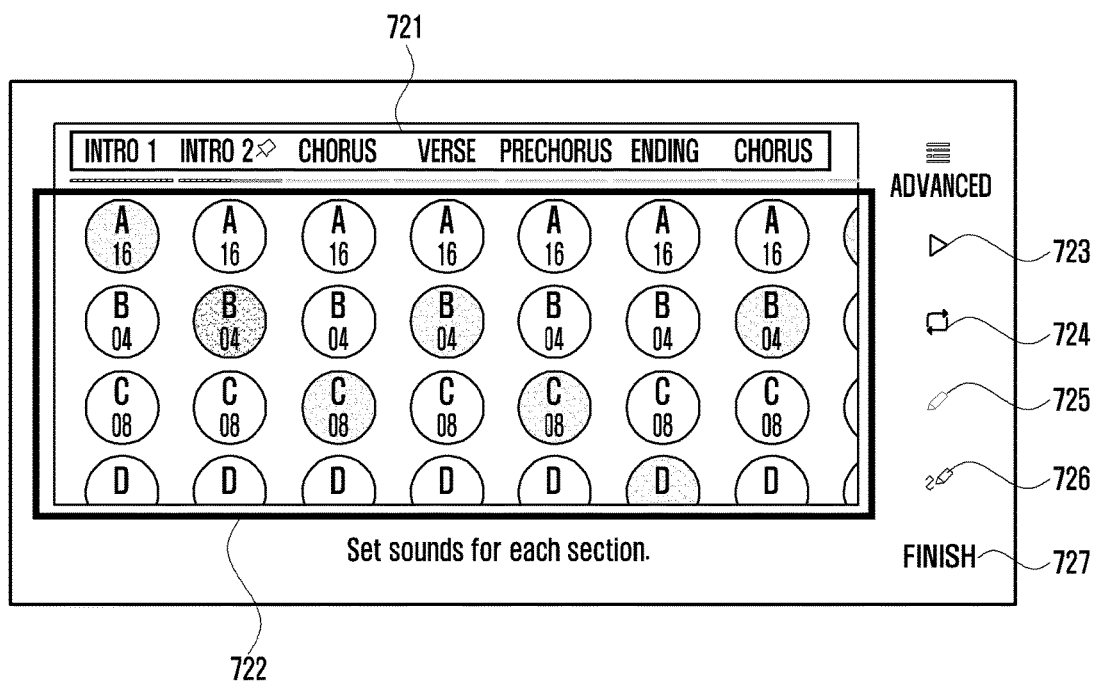

In an embodiment of the present disclosure, the processor 420 may edit a music package selected by a user and generate an audio file using the edited music package. FIG. 7E shows a screen for supporting editing of a first audio included in a music package based on a user selection. As shown in FIG. 7E, the first audio edit support screen may include a region 721 for displaying a list of sections of the first audio, a region 722 for displaying a list of sounds selectable in each section, a play button 723, a repeat button 724, a write button 725, a drawing input button 726, and a finish button 727. A list of selectable sounds for each section may indicate alternative sounds. Alternative sounds may refer to a set of sounds whose chord progression is identical or similar. A user can select one sound from among alternative sounds A, B, C and D. The processor 420 may edit a first audio using a combination of sounds selected by a user. In response to a user input on a play button 723, the processor 420 may control a speaker to reproduce a first audio. In response to a user input on a repeat button 724, the processor 420 may control a speaker to reproduce a first audio repeatedly. In response to a user input on a drawing input button 726, the processor 420 may control the display 410 to display a screen (e.g. FIG. 6A) for modifying a previously-entered drawing input. In response to an additional user input on the drawing input button 726, the processor 420 may control the display 410 to display a screen (e.g., FIG. 6A) for supporting separate drawing input to a selected section. An additional drawing input may indicate generating an independent second audio for each section of music. For example, a drawing input used for a chorus and a drawing input used for an introduction may be made different from each other to generate second audios separately used for the chorus and the introduction.

After selecting a music package, the processor 420 may control the display 410 to display a screen for receiving a user drawing input. FIG. 6A illustrates a screen capable of supporting a user drawing input. In FIG. 6A, the x-axis of a drawing input support screen may indicate beats and bars included in a motif, and the y-axis may indicate the pitch of the motif.

In response to a user input on the first audio edit button 617, the processor 420 may control the display 410 to display the screen shown in FIG. 7E. In response to a user input on the play button 618, the processor 420 may control a speaker to reproduce a second audio. In response to a user input on the repeat button 619, the processor 420 may control a speaker to reproduce a second audio repeatedly. In response to a user input on the play/non-play selection button 620 for a first audio, the processor 420 may control a speaker to reproduce or not reproduce a first audio corresponding to a second audio.

According to an embodiment of the present disclosure, a mobile device may include a touch display configured to sense a user input; a memory; and a processor. Upon receiving a user input for generating an audio file from a touch display, a processor may examine characteristics of a user input and characteristics of a first audio included in first audio data stored in a memory, generate melody data based on characteristics of the user input and the characteristics of the first audio, generate a second audio based on the melody data and chord information included in the first audio data, and generate the audio file by combining the generated second audio with the first audio.

A processor may determine a relative pitch in a motif of a second audio based on a height of a point on a curve generated by a user input, determine a beat in a motif of a second audio based on a length of the curve, modify the motif based on characteristics of the user input and characteristics of the first audio, and generate melody data based on the modified motif.

A processor may generate melody data by differentiating sound effects in consideration of a drawing order and velocity of lines included in a user input.

A processor may determine whether a velocity at which a line is drawn in a user input exceeds a preset value, modify a beat corresponding to a motif if the velocity exceeds the preset value, and modify a pitch corresponding to the motif if the velocity is less than or equal to the preset value.

A memory may temporarily or non-temporarily store a music package including a first audio and first audio data. In response to a user input for selecting a music package, a processor may identify a tag of the music package and determine sound effects to be applied to a second audio based on the identified tag.

A processor may determine a degree to which a motif is modified based on a size of an area occupied by lines included in a user input.

A processor may generate at least one phrase by combining a generated motif with a modified motif of the generated motif, and generate a second audio by using the at least one phrase.

Melody data may include relative pitch values corresponding respectively to notes included in the melody data. A processor may generate a second audio by converting relative pitch values corresponding to notes included in melody data to absolute pitch values based on a determined chord.

A processor may identify a chord scale of a first audio based on characteristics of the first audio, and generate a second audio by converting relative pitch values of notes included in melody data to absolute pitch values based on chord information corresponding to the second audio among pieces of chord information belonging to the chord scale.

Figure 8:
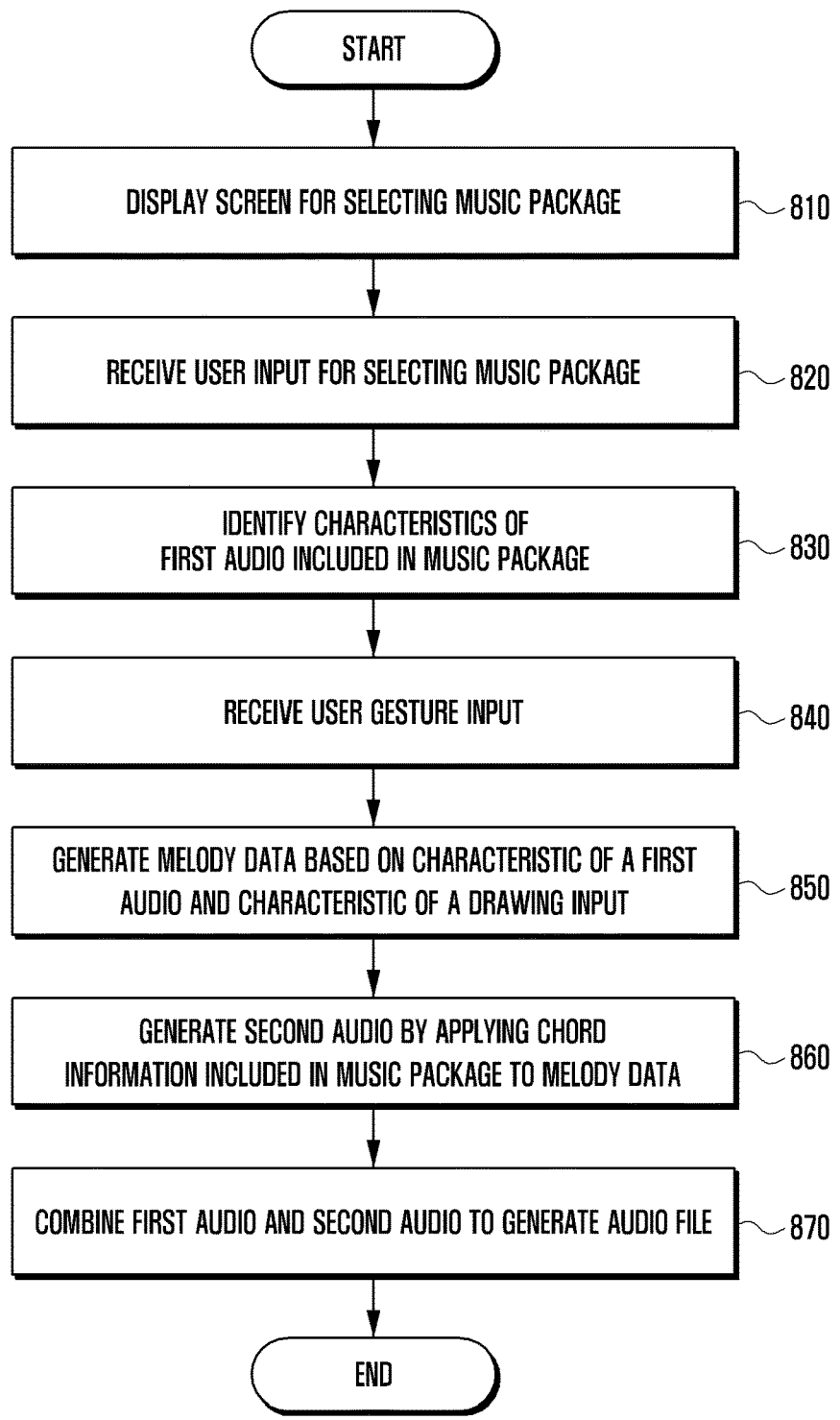
FIG. 8 is a flowchart of a method of an electronic device according to an embodiment of the present disclosure.

A mobile device may further include a sensor to collect ambient context information thereof. A processor may select a music package based on ambient context information and generate a second audio based on the ambient context information and characteristics of a first audio included in the music package. FIG. 8 is a flowchart of a method of an electronic device according to an embodiment of the present disclosure.

Referring to FIG. 8, at step 810, the processor 420 may control the display 410 to display a screen for selecting a music package. For example, the processor 420 may output the screen shown in FIGS. 7A to 7E on the display 410 and may receive a user input for selecting a music package.

At step 820, the processor 420 may receive a user input for selecting a music package. At step 830, the processor 420 may identify characteristics of a first audio included in a music package. For example, the processor 420 may identify characteristics of a first audio such as a length of the first audio, types of musical instruments used to produce the first audio, sounds output by musical instruments, and a tone, a pitch and a chord scale of the first audio.

At step 840, the processor 420 may receive a user gesture input. At step 850, the processor 420 may identify characteristics of the user gesture input. A user gesture input may include a drawing input. In an embodiment of the present disclosure, the processor 420 may identify characteristics of a user gesture input by using four layers. Characteristics of a gesture input may be identified by the four layers. The four layers may include a canvas layer that stores information on drawings contained in a gesture input, a motif layer that stores information on an order in which drawings are input by the gesture input and a position of each drawing on the canvas layer, a history layer that stores information regarding the order in which lines included in each drawing are drawn, a velocity at which each line is drawn, a position of each line drawn on the canvas layer, and a process in which each drawing is created, and an area layer that stores information regarding an area of the canvas layer occupied by each drawing included in a gesture input, and a point (or area) created by an intersection of drawings included in the gesture input. In various embodiments, the processor 420 may generate the four layers while receiving a gesture input from a user, and identify characteristics of a gesture input based on the four layers.

At step 850, the processor 420 may generate melody data based on characteristics of a first audio and characteristics of a drawing input. An operation of an electronic device for generating melody data is described below in greater detail with reference to FIG. 10.

At step 860, the processor 420 may generate a second audio by applying a chord scale associated with a first audio among characteristics of the first audio identified at operation 830 as being associated with melody data. As described before, melody data includes relative pitch values between notes included in the melody data. In an embodiment of the present disclosure, a method of an electronic device may effectively generate a second audio that may match a first audio by applying a chord scale associated with the first audio to melody data.

At step 870, the processor 420 may combine the first audio and the generated second audio to generate an audio file.

Figure 9:
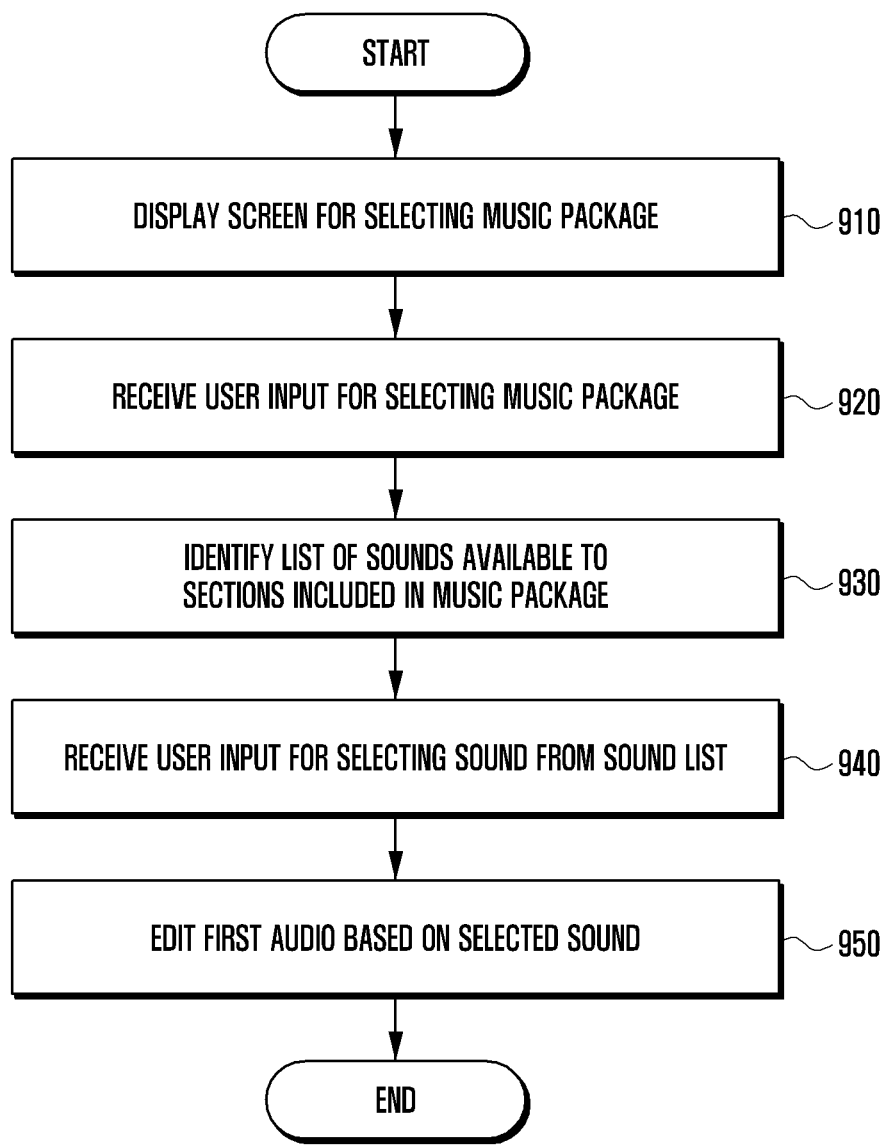
FIG. 9 is a flowchart of a method of accompaniment generation in an electronic device according to an embodiment of the present disclosure.

In the method of the electronic device described above with reference to FIG. 8, a user gesture input is received after selecting a music package. However, a music package may be selected after receiving a user gesture input. In an embodiment of the present disclosure, upon receiving a user gesture input, the processor 420 may determine characteristics of a user gesture input. The processor 420 may extract at least one music package corresponding to identified characteristics of a user gesture input and display a list of extracted music packages on the display 410. For example, in FIG. 8, the order of step 810 for displaying a screen for selecting a music package and step 840 for receiving a user gesture input may be changed. FIG. 9 is a flowchart of a method of first audio generation in an electronic device according to an embodiment of the present disclosure.

Referring to FIG. 9, the description below is of generating a first audio that is not equal to a first audio included in a music package.

At step 910, the processor 420 may control the display 410 to display a screen for selecting a music package. At step 920, the processor 420 may receive a user input for selecting a music package.

At step 930, the processor 420 may identify a list of sounds available in each section included in the first audio of the music package. A list of sounds available in each section may be displayed on the display 410 as shown in FIG. 7E. At step 940, the processor 420 may receive a user input for selecting a sound from the sound list.

Figure 10:
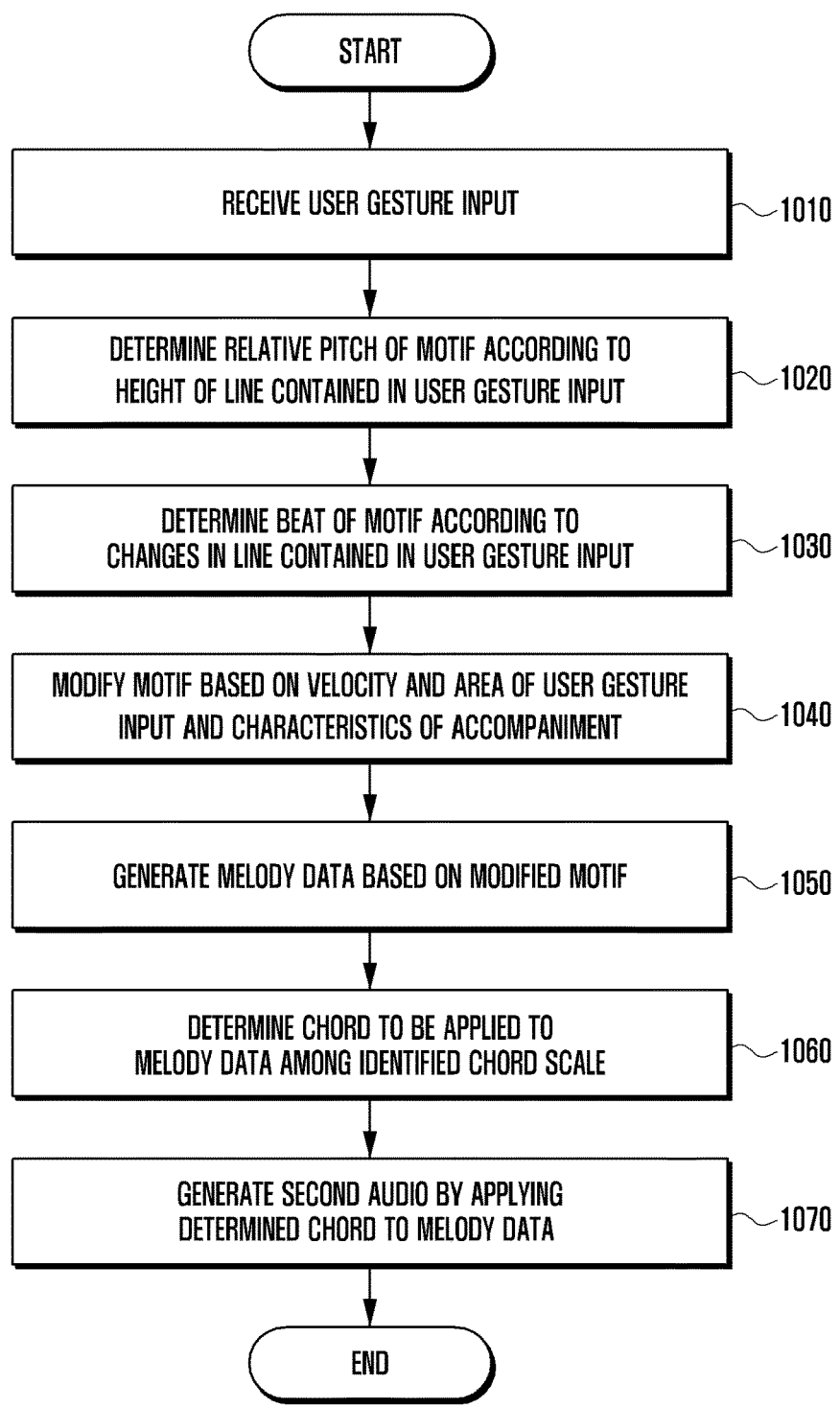
FIG. 10 is a flowchart of a method of melody generation based on user gesture input in an electronic device according to an embodiment of the present disclosure.

At step 950, the processor 420 may edit the first audio in response to the user input and generate an audio file corresponding to the first audio. The audio file generated at step 950 may be combined with the second audio generated by the processor 420 based on a user gesture input and may be used to generate a final audio file (composition file). FIG. 10 is a flowchart of a method of generating a second audio based on a user gesture input in an electronic device according to an embodiment of the present disclosure.

Referring to FIG. 10, at step 1010, the processor 420 may receive a user gesture input entered on the display 410.

At step 1020, the processor 420 may determine a relative pitch of a motif according to a height of a line contained in the user gesture input.

At step 1030, the processor 420 may determine a rhythm (e.g., beat) of the motif according to changes in the line contained in the user gesture input.

At step 1040, the processor 420 may modify the motif on the basis of a velocity and area of a user gesture input and characteristics of the first audio (accompaniment).

At step 1050, the processor 420 may generate melody data by using the modified motif and sound effects corresponding to the characteristics of the first audio.

At step 1060, the processor 420 may identify a chord scale included in the characteristics of the first audio and determine a chord corresponding to melody data among chords in the chord scale.

At step 1070, the processor 420 may generate a second audio by applying the determined chord to the melody data. The generated second audio may be used in conjunction with the first audio to create an audio file. The audio file may correspond to a piece of music finally composed by the user.

Figure 11:
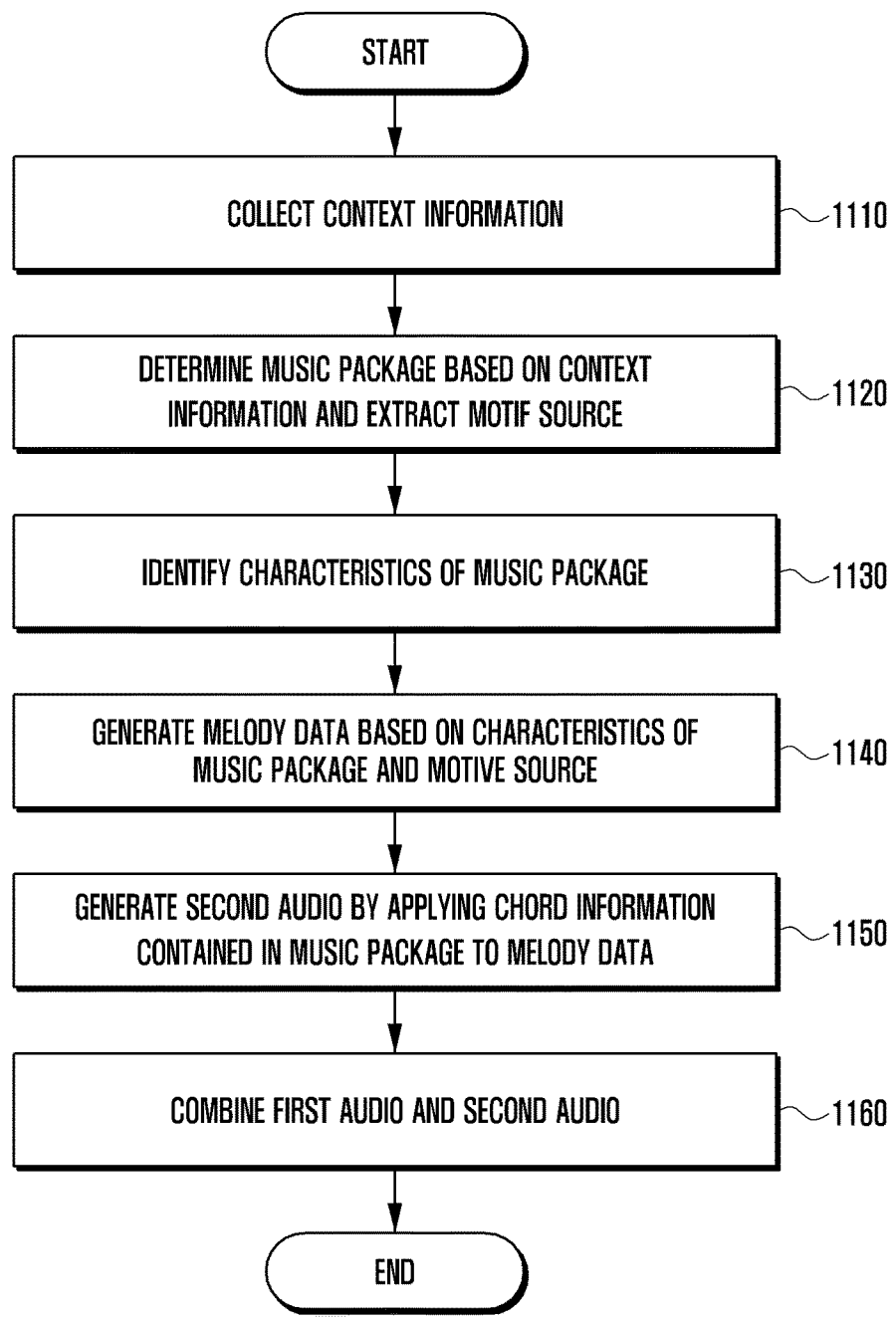
FIG. 11 is a flowchart of a method of an electronic device according to an embodiment of the present disclosure.

FIG. 11 is a flowchart of a method of an electronic device according to an embodiment of the present disclosure. The method may generate a motif source by using a user gesture input, or ambient context information collected through a sensor or stored in the electronic device.

Referring to FIG. 11, at step 1110, the processor 420 may receive ambient context information. The ambient context information may be collected through a sensor or stored in a memory of the electronic device. For example, the ambient context information may indicate profile information and activity information included in a user's SNS account. The ambient context information may also include various information such as local weather of an area where the electronic device is located, and a number of steps, movement speed, travel distance, and heart rate of a user.

At step 1120, the processor 420 may determine a music package based on the ambient context information and extract a motif source. The processor 420 may identify and determine the music package corresponding to the ambient context information among the music packages stored in the memory. The processor 420 may also generate a motif source in consideration of a sound output from the electronic device 400 (e.g. music played by a music player application). For example, the processor 420 may use a most repeated rhythm and pitch in a sound output from the electronic device 400 to generate the motif source. At step 1130, the processor 420 may identify characteristics of the music package.

At step 1140, the processor 420 may generate melody data based on characteristics of the first audio and the generated motif source. At step 1150, the processor 420 may apply a chord scale included in the characteristics of the first audio to the melody data to generate a second audio. At step 1160, the processor 420 may combine the generated second audio with the first audio to generate an audio file.

According to an embodiment of the present disclosure, a method for a mobile device may include receiving a first user input for selecting a music package including a first audio and characteristics of a first audio; identifying the characteristics of the first audio; receiving a second user input for generating an audio file from a touch display capable of sensing user input; identifying characteristics of a second user input; generating melody data based on characteristics of the second user input and the characteristics of the first audio; generating a second audio based on melody data and chord information included in the first audio data; and generating an audio file by combining the generated second audio with the first audio.

Generating melody data may include determining a relative pitch in a motif of a second audio based on a height of a point on a curve generated by a second user input; determining a beat in the motif based on a length of a line included in the second user input; modifying the motif based on characteristics of the second user input and characteristics of an accompaniment; and generating melody data based on the modified motif.

Generating melody data may further include generating the melody data by differentiating sound effects in consideration of a drawing order and velocity of lines included in the second user input.

Modifying a motif may include determining whether a velocity at which a line is drawn in a second user input exceeds a preset value; modifying a beat corresponding to the motif if the velocity exceeds a preset value; and modifying a pitch corresponding to the motif if the velocity is less than or equal to a preset value.

Modifying the motif may further include determining a degree to which the motif is modified based on a size of an area occupied by the lines included in the second user input.

Generating a second audio may include identifying a chord scale including information on chords of a first audio based on a characteristic of the first audio; and generating a second audio by converting relative pitch values of notes included in melody data to absolute pitch values based on chord information corresponding to the second audio among pieces of chord information belonging to the chord scale.

The method may further include selecting a music package including accompaniment and characteristics of a first audio based on ambient context information collected by a sensor of a mobile device; and generating melody data based on the ambient context information.

According to an embodiment of the present disclosure, a non-transitory storage medium storing a computer program that implements a method of a mobile device, wherein the computer program, when executed, causes the mobile device to receive a first user input for selecting a music package including a first audio and characteristics of the first audio; identify the characteristics of the first audio; receive a second user input for generating an audio file from a touch display capable of sensing user input; identify characteristics of the second user input; generate melody data based on characteristics of the second user input and the characteristics of the first audio; generate a second audio based on the melody data and chord information included in the first audio data; and generate an audio file by combining the generated second audio with the first audio.

To generate melody data, a computer program may cause a mobile device to determine a relative pitch in a motif of a second audio based on a height of a point on a curve generated by a second user input; determine a beat in the motif based on a length of a line included in the second user input; modify the motif based on characteristics of the second user input and characteristics of accompaniment; and generate melody data based on the modified motif.

To generate melody data, a computer program may cause a mobile device to generate the melody data by differentiating sound effects in consideration of a drawing order and velocity of lines included in a second user input.

To modify a motif, a computer program may cause a mobile device to determine whether a velocity at which a line is drawn in a second user input exceeds a preset value; modify a beat corresponding to the motif if the velocity exceeds a preset value; and modify a pitch corresponding to the motif if the velocity is less than or equal to the preset value.

To modify a motif, a computer program may cause a mobile device to determine a degree to which the motif is modified based on a size of an area occupied by lines included in a second user input.

To generate a second audio, a computer program may cause a mobile device to identify a chord scale including information on chords of a first audio based on characteristic of the first audio; and generate a second audio by converting relative pitch values of notes included in melody data to absolute pitch values based on chord information corresponding to the second audio among pieces of chord information belonging to a chord scale.

A computer program may further cause a mobile device to select a music package including accompaniment and characteristics of a first audio based on ambient context information collected by a sensor of the mobile device; and generate melody data based on the ambient context information. The method above is described with reference to flowcharts, methods, and computer program products according to embodiments of the present disclosure. It will be understood that each block of the flowcharts, and combinations of blocks in the flowcharts, may be implemented by computer program instructions. The computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. The computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowcharts may represent a module, a segment, or a portion of code, which includes one or more executable instructions for implementing the specified logical function(s). It should also be noted that in some alternative implementations, the functions noted in the blocks may occur out of order. For example, two blocks shown in succession may, in fact, be executed substantially concurrently or the blocks may sometimes be executed in the reverse order, depending upon the functionality involved.

Certain aspects of the present disclosure may also be embodied as computer readable code on a non-transitory computer readable recording medium. A non-transitory computer readable recording medium is any data storage device that may store data which may be thereafter read by a computer system. Examples of a non-transitory computer readable recording medium include a ROM, a RAM, compact disc-ROMs (CD-ROMs), magnetic tapes, floppy disks, and optical data storage devices. A non-transitory computer readable recording medium may also be distributed over network coupled computer systems so that computer readable code is stored and executed in a distributed fashion. In addition, functional programs, code, and code segments for accomplishing the present disclosure may be easily construed by programmers skilled in the art to which the present disclosure pertains.

Embodiments of the present disclosure may involve the processing of input data and the generation of output data to some extent. The input data processing and output data generation may be implemented in hardware or software in combination with hardware. For example, certain electronic components may be employed in a mobile device or similar or related circuitry for implementing the functions associated with the various embodiments of the present disclosure. Alternatively, one or more processors operating in accordance with stored instructions may implement the functions associated with the embodiments of the present disclosure. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure may be easily construed by programmers skilled in the art to which the present disclosure pertains.

Aspects of the embodiments of the present disclosure may be implemented in hardware, firmware or via the execution of software or computer code that may be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods of the present disclosure may be rendered via such software that is stored on the recording medium using a general purpose computer, or a special processor or in programmable or dedicated hardware, such as an ASIC or an FPGA. As would be understood in the art, a computer, a processor, a microprocessor controller or programmable hardware include memory components, e.g., RAM, ROM, flash memory, etc. that may store or receive software or computer code that when accessed and executed by the computer, the processor or the hardware implement the methods of the present disclosure.

While the present disclosure has been illustrated and described with reference to various embodiments thereof, it will be understood by those skilled in the art that various changes in form and details may be made therein without departing from the scope of the present disclosure as defined by the appended claims and their equivalents.

What is claimed is:

1. A mobile device, comprising:
a touch display configured to sense a user input;
a memory; and
a processor configured to:
identify, upon receiving the user input for generating an audio file from the touch display, characteristics of the user input and characteristics of a first audio included in first audio data stored in the memory;
generate melody data based on the characteristics of the user input and the characteristics of the first audio;
generate a second audio based on the melody data and chord information included in the first audio data; and
generate the audio file by combining the generated second audio with the first audio,
wherein the processor is further configured to:
determine a relative pitch in a motif of the second audio based on a height of a point on a curve generated by the user input;
determine a beat in the motif of the second audio based on a length of the curve;
modify the motif based on the characteristics of the user input and the characteristics of the first audio; and
generate the melody data based on the modified motif.

2. The mobile device of claim 1, wherein the processor is further configured to generate the melody data by differentiating sound effects in consideration of a drawing order and velocity of lines included in the user input.

3. The mobile device of claim 1, wherein the processor is further configured to determine whether the velocity at which a line is drawn in the user input exceeds a preset value, modify the beat corresponding to the motif if the velocity exceeds the preset value, and modify the relative pitch corresponding to the motif if the velocity is less than or equal to the preset value.

4. The mobile device of claim 1, wherein the memory is configured to temporarily or non-temporarily store a music package including the first audio and the first audio data, and wherein the processor is further configured to identify, in response to a second user input for selecting the music package, a tag of the music package, and determine sound effects to be applied to the second audio based on the identified tag.

5. The mobile device of claim 1, wherein the processor is further configured to determine a degree to which the motif is modified based on a size of an area occupied by the lines included in the user input.

6. The mobile device of claim 1, wherein the processor is further configured to generate at least one phrase by combining the generated motif with the modified motif of the generated motif, and generate the second audio by using the at least one phrase.

7. The mobile device of claim 1, wherein the melody data includes relative pitch values corresponding respectively to notes included in the melody data, and wherein the processor is further configured to generate the second audio by converting the relative pitch values corresponding to the notes included in the melody data to absolute pitch values based on a determined chord.

8. The mobile device of claim 7, wherein the processor is further configured to identify a chord scale of the first audio based on the characteristics of the first audio, and generate the second audio by converting the relative pitch values of the notes included in the melody data to the absolute pitch values based on the chord information corresponding to the second audio among pieces of chord information belonging to a chord scale.

9. The mobile device of claim 1, further comprising a sensor configured to collect ambient context information thereof, and wherein the processor is further configured to select a music package based on the ambient context information, and generate the second audio based on the ambient context information and characteristics of the first audio included in the music package.

10. A method for operating a mobile device, the method comprising:
receiving a first user input for selecting a music package including a first audio and characteristics of the first audio;
identifying the characteristics of the first audio;
receiving a second user input for generating an audio file from a touch display capable of sensing user input;
identifying characteristics of the second user input;
generating melody data based on the characteristics of the second user input and the characteristics of the first audio;
generating a second audio based on the melody data and chord information included in the first audio data; and
generating the audio file by combining the generated second audio with the first audio,
wherein the method further comprises:
determining a relative pitch in a motif of the second audio based on a height of a point on a curve generated by the second user input;
determining a beat in the motif based on a length of a line included in the second user input;
modifying the motif based on the characteristics of the second user input and characteristics of the accompaniment; and
generating the melody data based on the modified motif.

11. The method of claim 10, wherein generating melody data comprises generating the melody data by differentiating sound effects in consideration of a drawing order and velocity of lines included in the second user input.

12. The method of claim 10, wherein modifying the motif comprises:
determining whether a velocity at which the line is drawn in the second user input exceeds a preset value;
modifying the beat corresponding to the motif if the velocity exceeds the preset value; and
modifying the relative pitch corresponding to the motif if the velocity is less than or equal to the preset value.

13. The method of claim 10, wherein modifying the motif comprises determining a degree to which the motif is modified based on a size of an area occupied by the lines included in the second user input.

14. The method of claim 10, wherein generating a second audio comprises:
identifying a chord scale including information on chords of the first audio based on the characteristics of the first audio; and
generating the second audio by converting relative pitch values of notes included in the melody data to absolute pitch values based on chord information corresponding to the second audio among pieces of chord information belonging to a chord scale.

15. The method of claim 10, further comprising:
selecting a music package including an accompaniment and the characteristics of the first audio based on ambient context information collected by a sensor of the mobile device; and
generating the melody data based on the ambient context information.

16. A non-transitory computer-readable storage medium storing a computer program configured to implement an operation method for a mobile device, wherein the computer program, when executed, causes the mobile device to:
receive a first user input for selecting a music package including a first audio and characteristics of the first audio;
identify the characteristics of the first audio;
receive a second user input for generating an audio file from a touch display capable of sensing user input;
identify characteristics of the second user input;
generate melody data based on the characteristics of the second user input and the characteristics of the first audio;
generate a second audio based on the melody data and chord information included in the first audio data; and
generate the audio file by combining the generated second audio with the first audio,
wherein the computer program causes the mobile device to:
determine a relative pitch in a motif of the second audio based on a height of a point on a curve generated by a user gesture input;
determine a beat in the motif based on a length of the curve;
modify the motif based on characteristics of the user gesture input and the characteristics of the first audio; and
generate the melody data based on the modified motif.

17. The non-transitory computer-readable storage medium of claim 16, wherein the melody data includes relative pitch values corresponding respectively to notes included in the melody data, and wherein the computer program causes the mobile device to generate the second audio by converting the relative pitch values corresponding to the notes included in the melody data to absolute pitch values based on a determined chord.

* * * * *